(12) United States Patent
Soriaga et al.

(10) Patent No.: US 11,490,354 B2
(45) Date of Patent: Nov. 1, 2022

(54) ROUND-TRIP-TIME (RTT)-BASED POSITIONING WITH LISTENING NODES

(71) Applicant: QUALCOMM Incorporated, San Diego, CA (US)

(72) Inventors: Joseph Binamira Soriaga, San Diego, CA (US); Alexandros Manolakos, San Diego, CA (US); Jay Kumar Sundararajan, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 16/739,057

(22) Filed: Jan. 9, 2020

(65) Prior Publication Data
US 2020/0229126 A1 Jul. 16, 2020

(30) Foreign Application Priority Data
Jan. 11, 2019 (GR) ............................... 20190100024

(51) Int. Cl.
*H04W 64/00* (2009.01)
*H04L 47/283* (2022.01)
(Continued)

(52) U.S. Cl.
CPC ............. *H04W 64/003* (2013.01); *G01S 5/14* (2013.01); *H04B 7/0695* (2013.01);
(Continued)

(58) Field of Classification Search
CPC combination set(s) only.
See application file for complete search history.

(56) References Cited

U.S. PATENT DOCUMENTS 5,838,674 A * 11/1998 Forssen ................. H04W 16/28
370/347
5,987,037 A * 11/1999 Gans ..................... H01Q 25/00
370/480
(Continued)

FOREIGN PATENT DOCUMENTS

WO 2018028960 A1 2/2018

OTHER PUBLICATIONS

Fraunhofertis, et al., "NR Beam Management Supporting Multi-gNB Measurements for Positioning", 3GPP Draft, R1-1813583, NR_Multi_TRP_Beam_Management_for_TDOA_Posttioning, 3rd Generation Partnership Project (3GPP), Mobile Competence Centre, 650, Route Des Lucioles, F-06921 Sophia-Antipolis Cedex, vol. RAN WG1, No. Spokane, US, Nov. 12-Nov. 16, 2018, Nov. 2, 2018 (Nov. 2, 2018), XP051479922, 8 pages.

(Continued)

*Primary Examiner* — Vinncelas Louis
(74) *Attorney, Agent, or Firm* — Campbell C. Chiang; MG-IP Law, P.C.

(57) ABSTRACT

Disclosed are techniques for positioning a user equipment (UE). In aspects, a listening node determines a first time of arrival (ToA) at the listening node of a first radio frequency (RF) signal sent by a transmission-reception point (TRP) to the UE, determines a second ToA at the listening node of a second RF signal sent by the UE to the TRP, determines a time difference between the first ToA and the second ToA, and enables a positioning entity to estimate a location of the UE based on the time difference. The positioning entity calculates a distance between the listening node and the UE based on the time difference, a propagation time between the TRP and the listening node, a propagation time between the TRP and the UE, and a time difference between a ToA of the first RF signal at the UE and a transmission time of the second RF signal.

28 Claims, 19 Drawing Sheets

(51) Int. Cl.
  *H04J 3/06* (2006.01)
  *H04W 4/029* (2018.01)
  *H04B 7/06* (2006.01)
  *H04L 5/00* (2006.01)
  *G01S 5/14* (2006.01)

(52) U.S. Cl.
  CPC .......... *H04J 3/0682* (2013.01); *H04L 5/0062* (2013.01); *H04L 47/283* (2013.01); *H04W 4/029* (2018.02)

(56) References Cited

U.S. PATENT DOCUMENTS

| | | | |
|---|---|---|---|
| 2010/0008270 A1 | 1/2010 | Ahn et al. | |
| 2011/0156878 A1* | 6/2011 | Wu | G01S 5/06 340/10.1 |
| 2015/0063138 A1* | 3/2015 | Aldana | G01S 5/0081 370/252 |
| 2015/0094103 A1* | 4/2015 | Wang | H04W 4/023 455/456.6 |
| 2015/0139212 A1* | 5/2015 | Wang | G01S 5/06 370/338 |
| 2017/0111857 A1* | 4/2017 | Lightstone | G01S 5/0205 |
| 2017/0325057 A1 | 11/2017 | Zhang et al. | |
| 2017/0374637 A1* | 12/2017 | Akkarakaran | H04W 64/006 |
| 2019/0141554 A1* | 5/2019 | Siomina | H04B 17/309 |
| 2019/0182798 A1 | 6/2019 | Beale et al. | |

OTHER PUBLICATIONS

International Search Report and Written Opinion—PCT/US2020/013236—ISA/EPO—dated Apr. 3, 2020.

* cited by examiner

Frame timing after sync error adjustment

Once synchronized, network can use SRS heard from UE at both BS and LN for UTDOA positioning Listening Node Positioning Entity

ROUND-TRIP-TIME (RTT)-BASED POSITIONING WITH LISTENING NODES

CROSS-REFERENCE TO RELATED APPLICATIONS

The present Application for Patent claims priority under 35 U.S.C. § 119 to Greek Patent Application No. 20190100024, entitled "ROUND-TRIP-TIME (RTT)-BASED POSITIONING WITH LISTENING NODES," filed Jan. 11, 2019, which is assigned to the assignee hereof, and expressly incorporated herein by reference in its entirety.

BACKGROUND OF THE DISCLOSURE

1. Field of the Disclosure

Aspects of the disclosure relate generally to telecommunications, and more particularly to round trip time (RTT)-based positioning with listening nodes.

2. Description of the Related Art

Location determination capabilities for mobile devices have conventionally been provided using satellite positioning systems (SPS), sometimes augmented with cellular network positioning techniques. Mobile devices often support popular and increasingly important SPS wireless technologies that may include, for example, the Global Positioning System (GPS) and/or a global navigation satellite system (GNSS). Mobile devices supporting SPS may obtain navigation signals as wireless transmissions received from one or more transmitter-equipped satellites that may be used to estimate geographic position and heading. Some mobile devices may additionally or alternatively obtain navigation signals as wireless transmissions received from terrestrial based transmitters to estimate geographic position and heading.

In conventional cellular networks, location information can be provided by various time and/or phase measurement techniques. For example, in code division multiple access (CDMA) networks, one position determination approach used is advanced forward link trilateration (AFLT). Using AFLT, a mobile device may compute its position from phase measurements of pilot signals transmitted from a plurality of base stations. Improvements to AFLT have been realized by utilizing hybrid position location techniques, where the mobile device may employ an SPS receiver that can provide position information independently of the information derived from the signals transmitted by the base stations. Moreover, location accuracy can be improved by combining measurements derived from both SPS and AFLT systems using conventional techniques. However, present techniques are not especially effective indoors.

A fifth generation (5G) wireless standard, referred to as New Radio (NR), enables higher data transfer speeds, greater numbers of connections, and better coverage, among other improvements. Consequently, the spectral efficiency of 5G mobile communications should be significantly enhanced compared to the current standard. Furthermore, signaling efficiencies should be enhanced and latency should be substantially reduced compared to current standards. These enhancements permit 5G networks to provide another source of positioning reference information, particularly in indoor environments.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a listening node in a wireless communications network includes determining a first time of arrival (ToA) at the listening node of a first reference radio frequency (RF) signal sent by a transmission-reception point (TRP) to a user equipment (UE), determining a second ToA at the listening node of a second reference RF signal sent by the UE to the TRP, determining a first time difference between the first ToA and the second ToA, and enabling a positioning entity to estimate a location of the UE based on the first time difference.

In an aspect, a method of operating a positioning entity in a wireless communication network includes receiving, from a first listening node, a first time difference between a first ToA at the first listening node of a first reference RF signal sent by a TRP to a UE and a second ToA at the first listening node of a second reference RF signal sent by the UE to the TRP, receiving, from a second listening node, a second time difference between a first ToA at the second listening node of the first reference RF signal and a second ToA at the second listening node of the second reference RF signal, and estimating a location of the UE based on a distance between the first listening node and the UE, a distance between the second listening node and the UE, and a distance between the TRP and the UE.

In an aspect, a listening node includes a memory, at least one transceiver, and a processing system communicatively coupled to the memory and the at least one transceiver, wherein the processing system is configured to: determine a first ToA at the listening node of a first reference RF signal sent by a TRP to a UE, determine a second ToA at the listening node of a second reference RF signal sent by the UE to the TRP, determine a first time difference between the first ToA and the second ToA, and enable a positioning entity to estimate a location of the UE based on the first time difference.

In an aspect, a positioning entity includes a memory, at least one network interface, and a processing system communicatively coupled to the memory and the at least one network interface, wherein the processing system is configured to: receive, from a first listening node via the communication device, a first time difference between a first ToA at the first listening node of a first reference RF signal sent by a TRP to a UE and a second ToA at the first listening node of a second reference RF signal sent by the UE to the TRP, receive, from a second listening node via the communication device, a second time difference between a first ToA at the second listening node of the first reference RF signal sent by the TRP to the UE and a second ToA at the second listening node of the second reference RF signal sent by the UE to the TRP, and estimate a location of the UE based on a distance between the first listening node and the UE, a distance between the second listening node and the UE, and a distance between the TRP and the UE.

In an aspect, a listening node includes means for determining a first time of arrival (ToA) at the listening node of a first reference RF signal sent by a TRP to a UE, means for determining a second ToA at the listening node of a second reference RF signal sent by the UE to the TRP, means for determining a first time difference between the first ToA and the second ToA, and means for enabling a positioning entity to estimate a location of the UE based on the first time difference.

In an aspect, a positioning entity includes means for receiving, from a first listening node, a first time difference between a first ToA at the first listening node of a first reference RF signal sent by a TRP to a UE and a second ToA at the first listening node of a second reference RF signal sent by the UE to the TRP, means for receiving, from a second listening node, a second time difference between a first ToA at the second listening node of the first reference RF signal and a second ToA at the second listening node of the second reference RF signal, and means for estimating a location of the UE based on a distance between the first listening node and the UE, a distance between the second listening node and the UE, and a distance between the TRP and the UE.

In an aspect, a non-transitory computer-readable medium storing computer-executable instructions includes computer-executable instructions comprising at least one instruction instructing a listening node to determine a first ToA at the listening node of a first reference radio frequency (RF) signal sent by a TRP to a UE, at least one instruction instructing the listening node to determine a second ToA at the listening node of a second reference RF signal sent by the UE to the TRP, at least one instruction instructing the listening node to determine a first time difference between the first ToA and the second ToA, and at least one instruction instructing the listening node to enable a positioning entity to estimate a location of the UE based on the first time difference.

In an aspect, a non-transitory computer-readable medium storing computer-executable instructions includes computer-executable instructions comprising at least one instruction instructing a positioning entity to receive, from a first listening node, a first time difference between a first ToA at the first listening node of a first reference RF signal sent by a TRP to a UE and a second ToA at the first listening node of a second reference RF signal sent by the UE to the TRP, at least one instruction instructing the positioning entity to receive, from a second listening node, a second time difference between a first ToA at the second listening node of the first reference RF signal and a second ToA at the second listening node of the second reference RF signal, and at least one instruction instructing the positioning entity to estimate a location of the UE based on a distance between the first listening node and the UE, a distance between the second listening node and the UE, and a distance between the TRP and the UE.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

Figure 1:
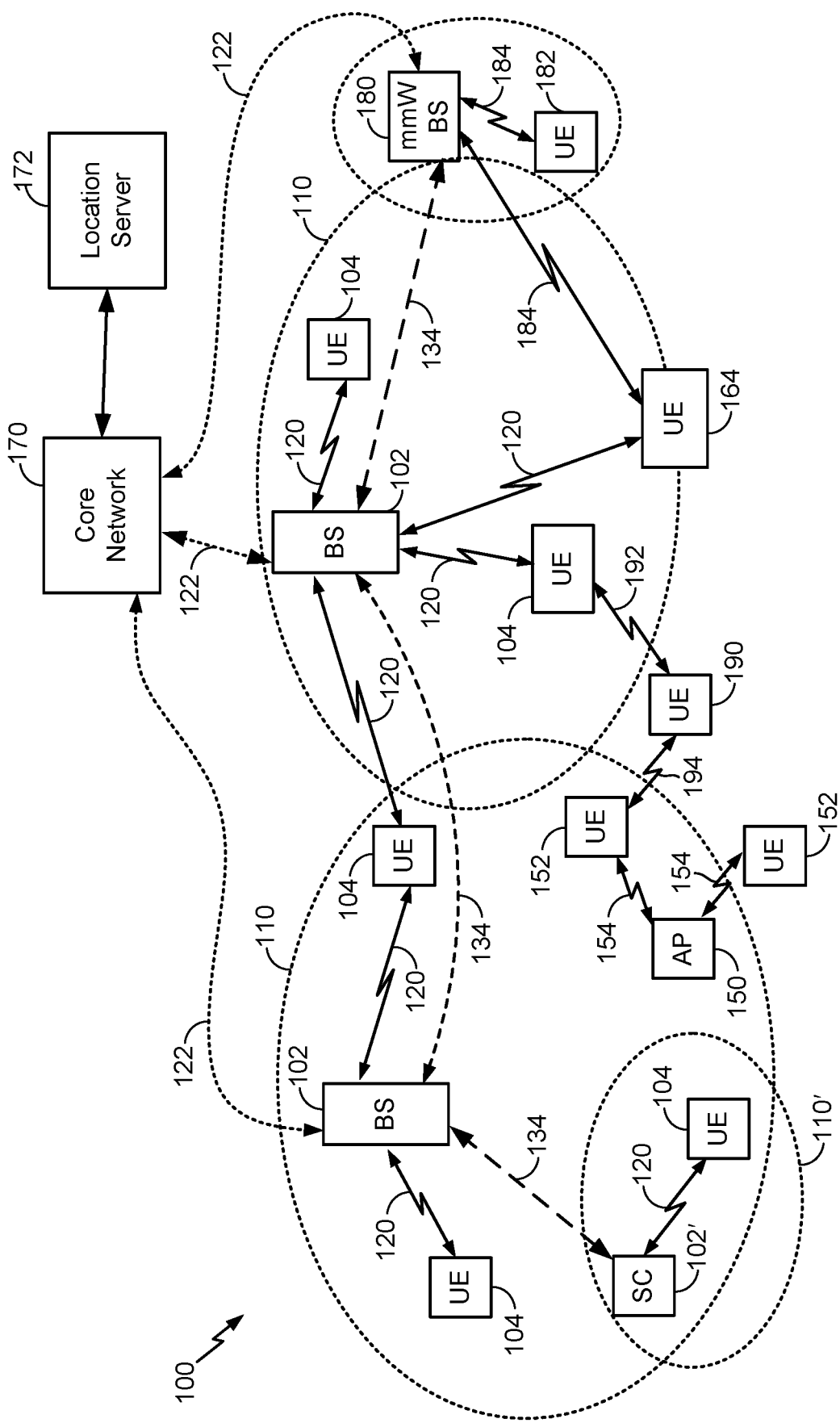
FIG. 1 illustrates an exemplary wireless communications system, according to various aspects.

Elements, stages, steps, and/or actions with the same reference label in different drawings may correspond to one another (e.g., may be similar or identical to one another). Further, some elements in the various drawings may be labelled using a numeric prefix followed by an alphabetic or numeric suffix. Elements with the same numeric prefix but different suffixes may be different instances of the same type of element. The numeric prefix without any suffix is used herein to reference any element with this numeric prefix.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
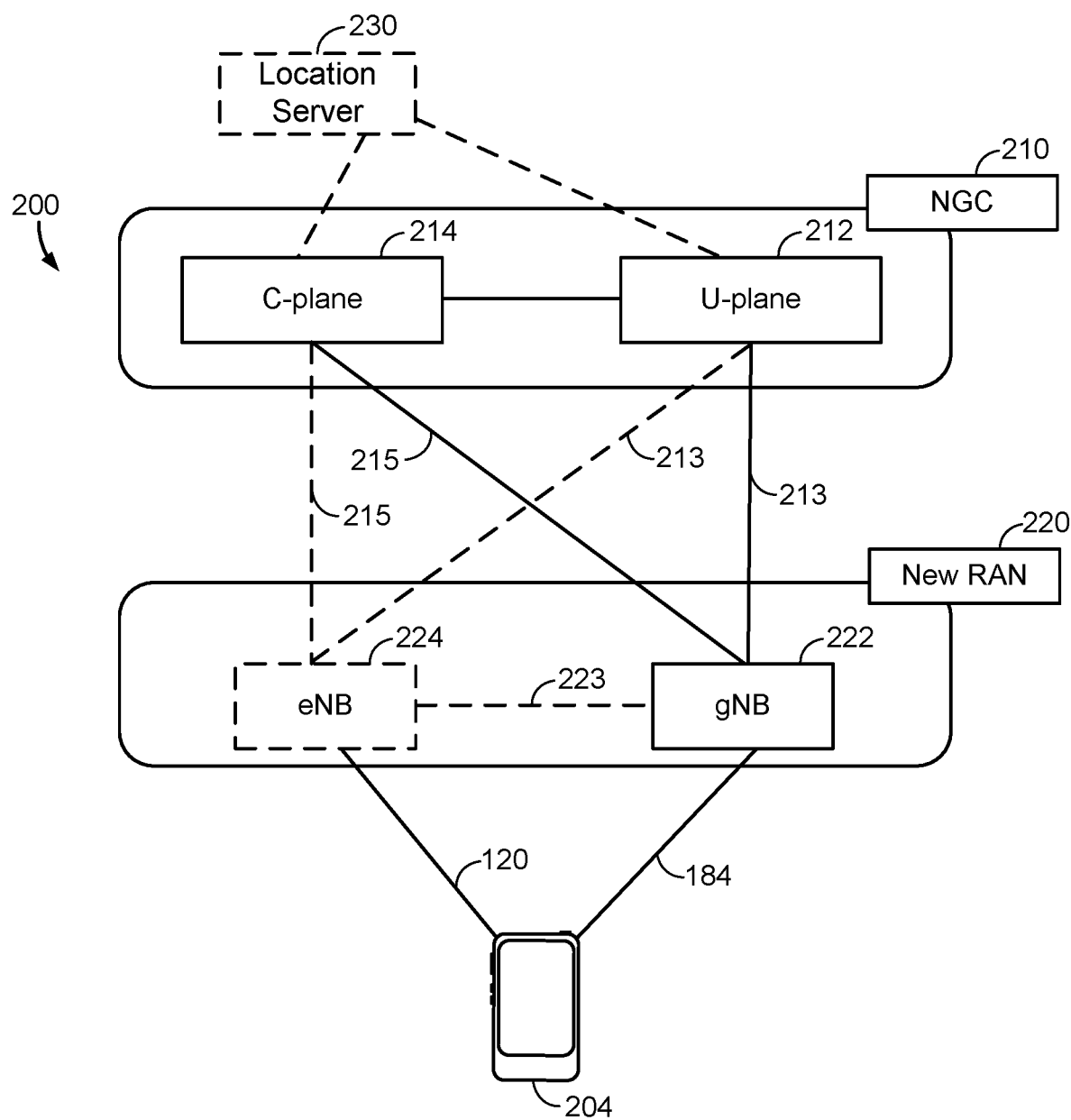
FIGS. 2A and 2B illustrate example wireless network structures, according to various aspects.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
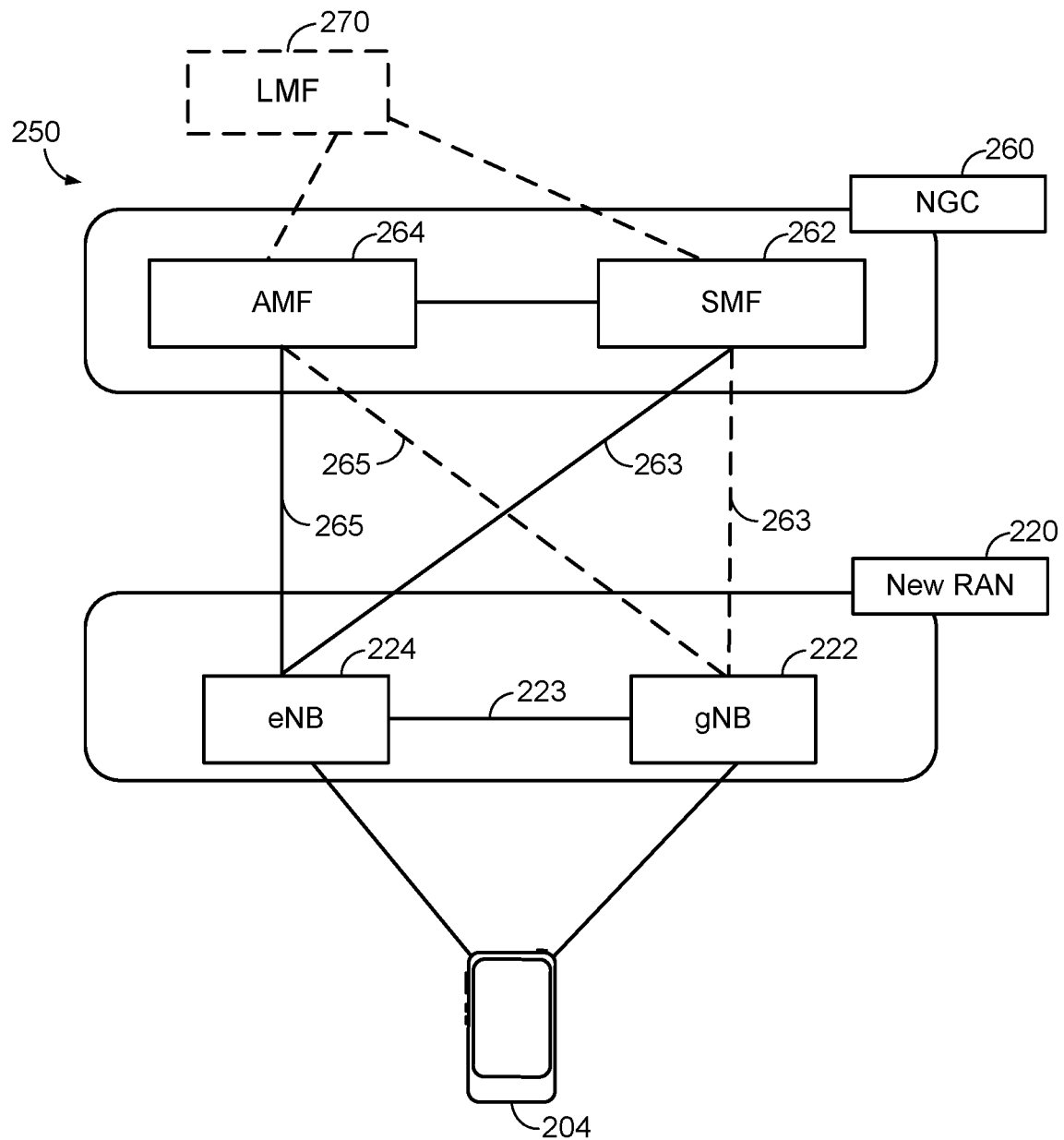

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
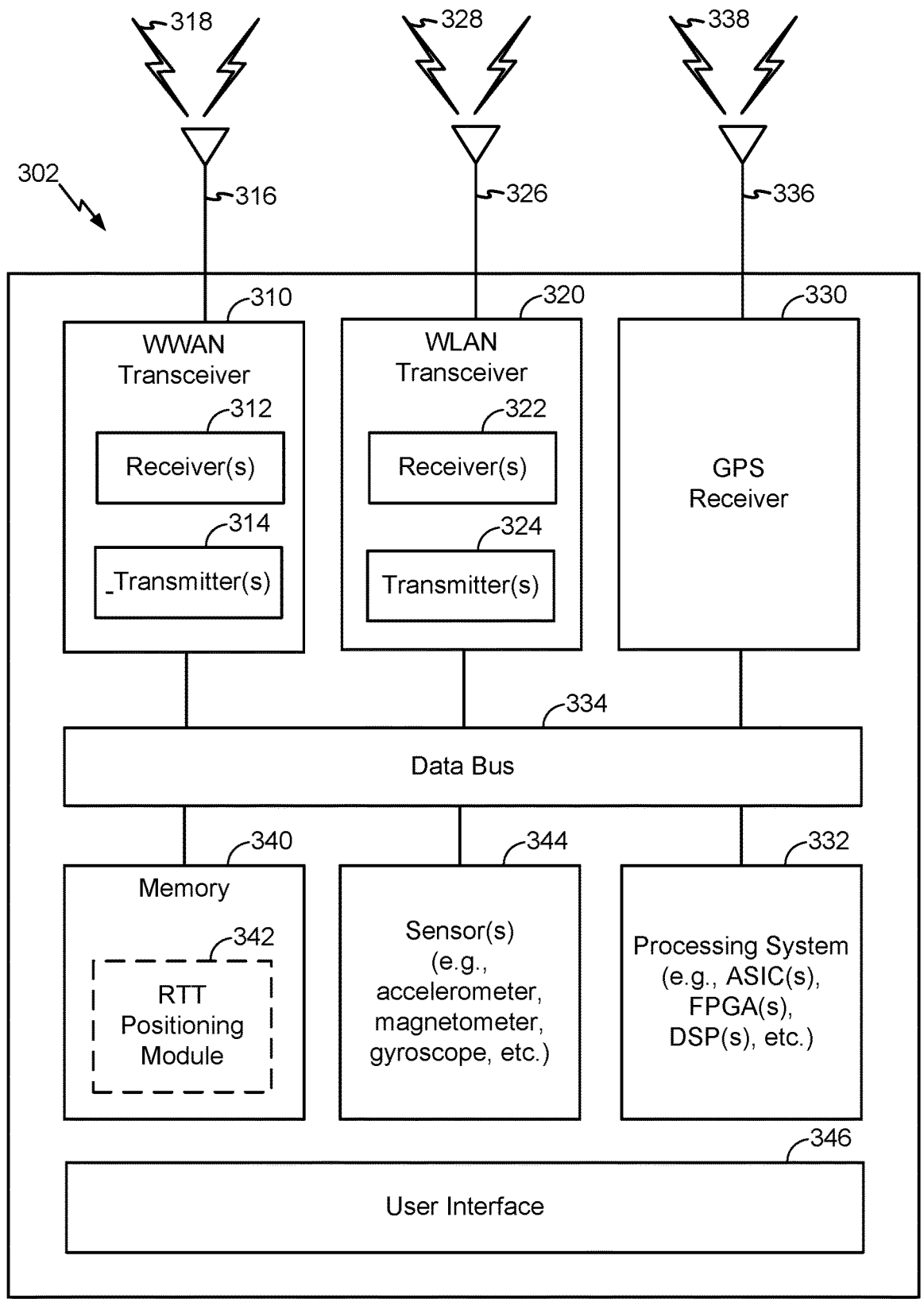
FIGS. 3A to 3C are simplified block diagrams of several sample aspects of components that may be employed in wireless communication nodes and configured to support communication as taught herein.
Figure 3B:
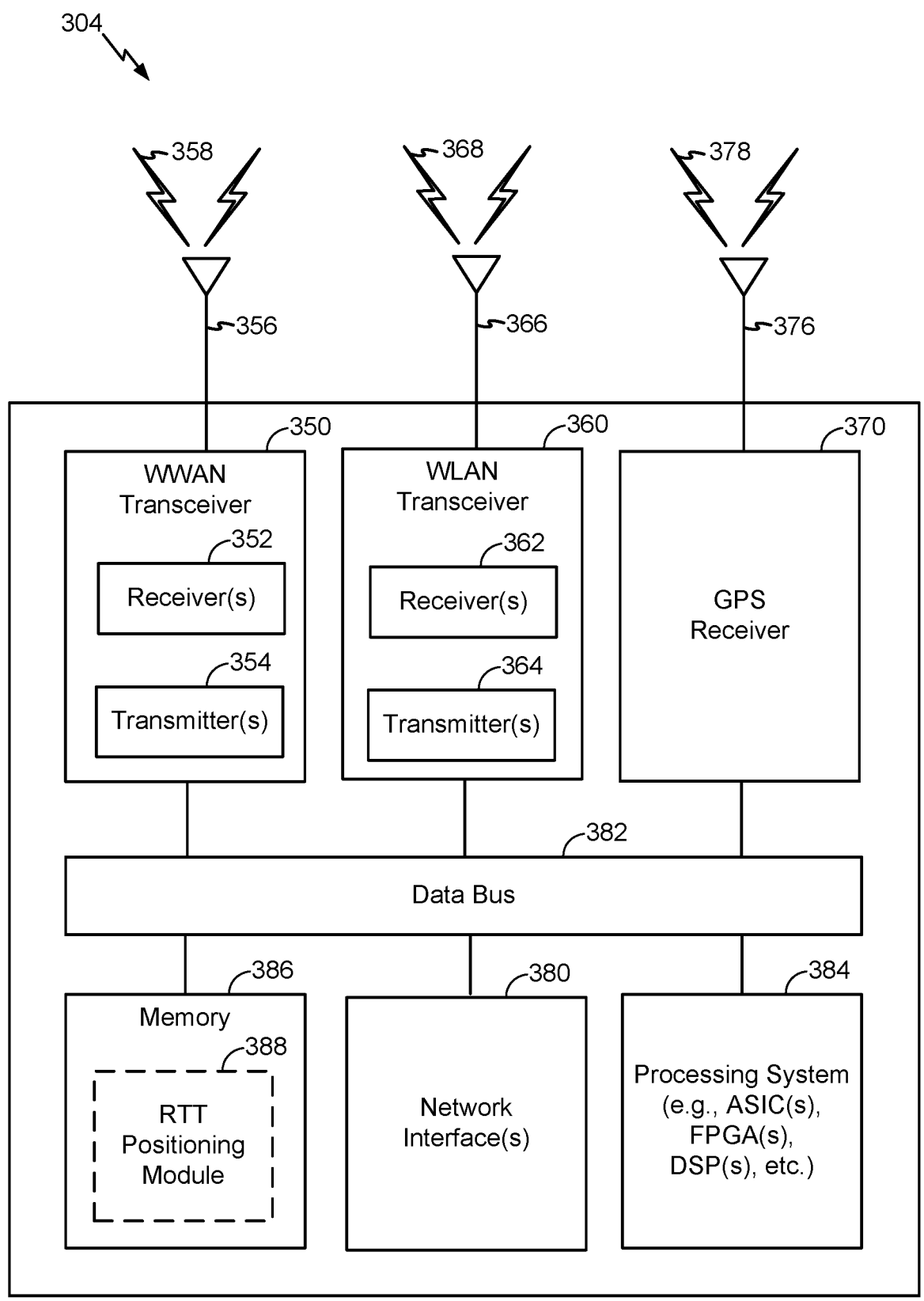
Figure 3C:
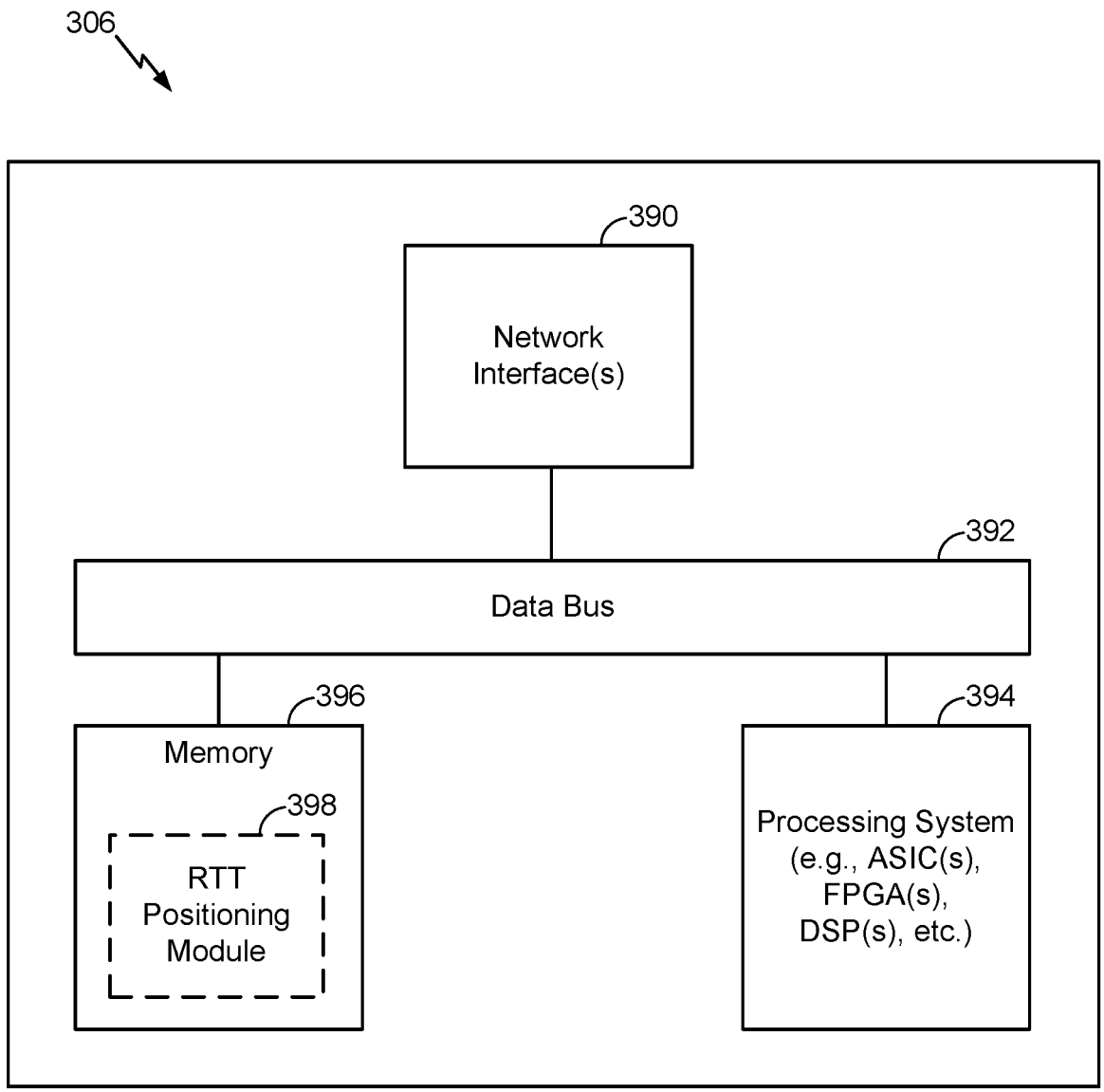

FIGS. 3A, 3B, and 3C illustrate several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including a transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, and 366), such as an antenna array, that permits the respective apparatus to perform transmit "beamforming," as described herein. Similarly, a receiver may include or be coupled to a plurality of antennas (e.g., antennas 316, 326, 356, and 366), such as an antenna array, that permits the respective apparatus to perform receive beamforming, as described herein. In an aspect, the transmitter and receiver may share the same plurality of antennas (e.g., antennas 316, 326, 356, and 366), such that the respective apparatus can only receive or transmit at a given time, not both at the same time. A wireless communication device (e.g., one or both of the transceivers 310 and 320 and/or 350 and 360) of the apparatuses 302 and/or 304 may also comprise a network listen module (NLM) or the like for performing various measurements.

The apparatuses 302 and 304 also include, at least in some cases, global positioning systems (GPS) receivers 330 and 370. The GPS receivers 330 and 370 may be connected to one or more antennas 336 and 376, respectively, for receiving GPS signals 338 and 378, respectively. The GPS receivers 330 and 370 may comprise any suitable hardware and/or software for receiving and processing GPS signals 338 and 378, respectively. The GPS receivers 330 and 370 request information and operations as appropriate from the other systems, and performs calculations necessary to determine the apparatus' 302 and 304 positions using measurements obtained by any suitable GPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving: messages, parameters, or other types of information.

The apparatuses 302, 304, and 306 also include other components that may be used in conjunction with the operations as disclosed herein. The UE 302 includes processor circuitry implementing a processing system 332 for providing functionality relating to, for example, RTT measurements in a licensed or unlicensed frequency band as disclosed herein and for providing other processing functionality. The base station 304 includes a processing system 384 for providing functionality relating to, for example, RTT measurements in a licensed or unlicensed frequency band as disclosed herein and for providing other processing functionality. The network entity 306 includes a processing system 394 for providing functionality relating to, for example, RTT measurements in a licensed or unlicensed frequency band as disclosed herein and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 include memory circuitry implementing memory components 340, 386, and 396 (e.g., each including a memory device), respectively, for maintaining information (e.g., information indicative of reserved resources, thresholds, parameters, and so on). In some cases, the apparatuses 302, 304, and 306 may include RTT positioning modules 342, 388, and 398, respectively. The RTT positioning modules 342, 388, and 398 may be hardware circuits that are part of or coupled to the processing systems 332, 384, and 394, respectively, that, when executed, cause the apparatuses 302, 304, and 306 to perform the functionality described herein. Alternatively, the RTT positioning modules 342, 388, and 398 may be memory modules (as shown in FIGS. 3A-C) stored in the memory components 340, 386, and 396, respectively, that, when executed by the processing systems 332, 384, and 394, cause the apparatuses 302, 304, and 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the GPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor.

Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the apparatuses 302, 304, and/or 306 are shown in FIGS. 3A-C as including various components that may be configured according to the various examples described herein. It will be appreciated, however, that the illustrated blocks may have different functionality in different designs.

The various components of the apparatuses 302, 304, and 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the RTT positioning modules 342, 388, and 398, etc.

Figure 4:
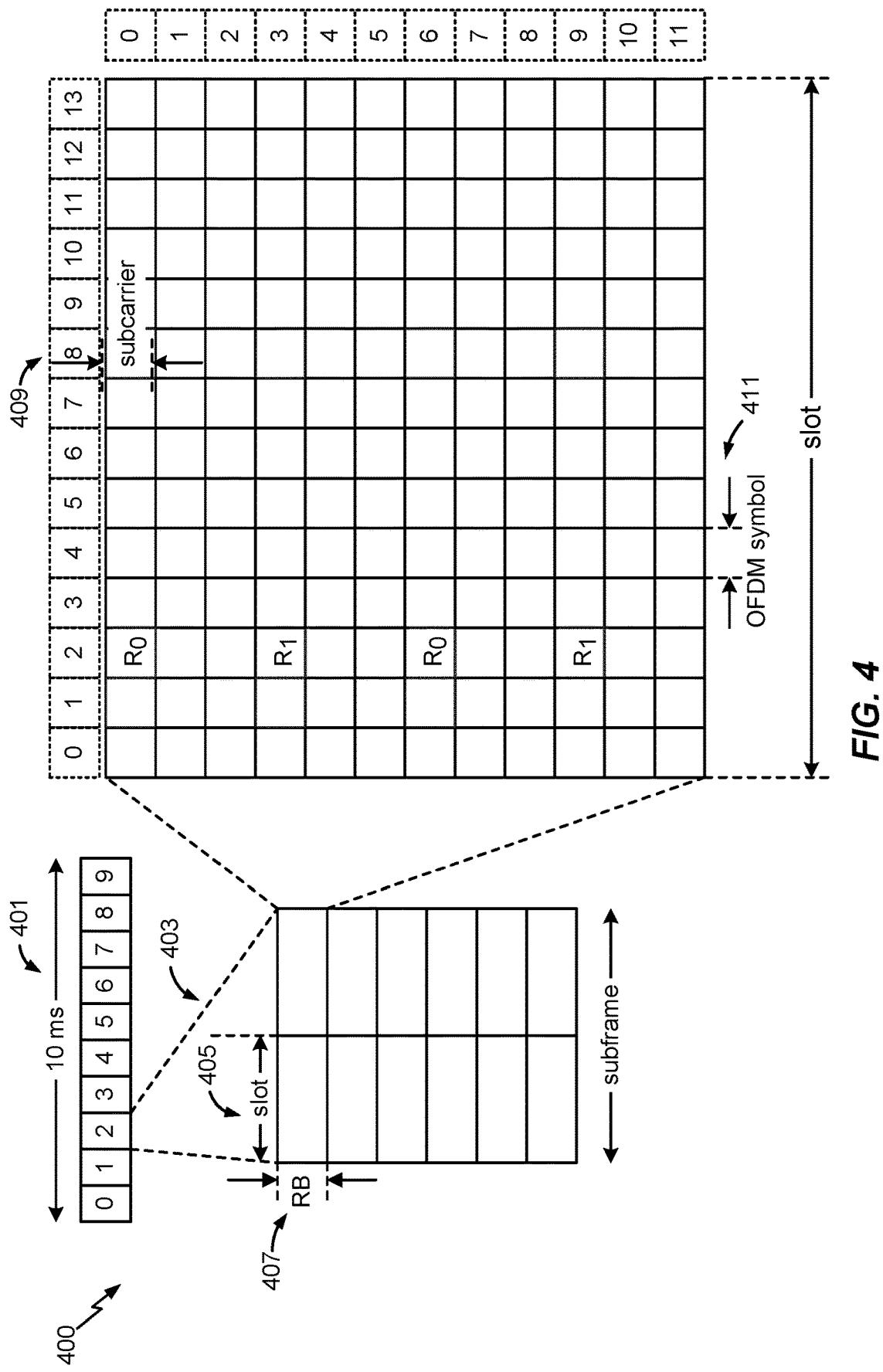
FIG. 4 is a diagram illustrating an example of a frame structure for use in a wireless telecommunications system according to an aspect of the disclosure.

Various frame structures may be used to support downlink and uplink transmissions between network nodes (e.g., base stations and UEs). FIG. 4 illustrates an example of a downlink frame structure 400 according to aspects of the disclosure. However, as those skilled in the art will readily appreciate, the frame structure for any particular application may be different depending on any number of factors. In FIG. 4, time is represented horizontally (e.g., on the X axis) with time increasing from left to right, while frequency is represented vertically (e.g., on the Y axis) with frequency increasing (or decreasing) from bottom to top. In the time domain, a frame 410 (10 ms) is divided into 10 equally sized subframes 420 (1 ms). Each subframe 420 includes two consecutive time slots 430 (0.5 ms).

A resource grid may be used to represent two time slots 430, each time slot 430 including one or more resource blocks (RBs) 440 (also referred to as "physical resource blocks" or "PRBs" in the frequency domain). In LTE, and in some cases NR, a resource block 440 contains 12 consecutive subcarriers 450 in the frequency domain and, for a normal cyclic prefix (CP) in each OFDM symbol 460, 7 consecutive OFDM symbols 460 in the time domain. A resource of one OFDM symbol length in the time domain and one subcarrier in the frequency domain (represented as a block of the resource grid) is referred to as a resource element (RE). As such, in the example of FIG. 4, there are 84 resource elements in a resource block 440.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers 450, which are also commonly referred to as tones, bins, etc. Each subcarrier 450 may be modulated with data. In general, modulation symbols are sent in the frequency domain with OFDM and in the time domain with SC-FDM. The spacing between adjacent subcarriers 450 may be fixed, and the total number of subcarriers 450 (K) may be dependent on the system bandwidth. For example, the spacing of the subcarriers 450 may be 15 kHz and the minimum resource allocation (resource block) may be 12 subcarriers 450 (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast NR may support multiple numerologies, for example, subcarrier spacing of 15 kHz, 30 kHz, 60 kHz, 120 kHz and 240 kHz or greater may be available. Table 1 provided below lists some various parameters for different NR numerologies.

TABLE 1

| Sub-carrier spacing (kHz) | Symbols/slot | slots/sub-frame | slots/frame | slot (ms) | Symbol duration (μs) | Max. nominal system BW (MHz) with 4K FFT size |
|---|---|---|---|---|---|---|
| 15  | 14 | 1  | 10  | 1      | 66.7 | 50  |
| 30  | 14 | 2  | 20  | 0.5    | 33.3 | 100 |
| 60  | 14 | 4  | 40  | 0.25   | 16.7 | 100 |
| 120 | 14 | 8  | 80  | 0.125  | 8.33 | 400 |
| 240 | 14 | 16 | 160 | 0.0625 | 4.17 | 800 |

With continued reference to FIG. 4, some of the resource elements, indicated as $R_0$ and $R_1$, include a downlink reference signal (DL-RS). The DL-RS may include cell-specific RS (CRS) (also sometimes called common RS) and UE-specific RS (UE-RS). UE-RS are transmitted only on the resource blocks 440 upon which the corresponding physical downlink shared channel (PDSCH) is mapped. The number of bits carried by each resource element depends on the modulation scheme. Thus, the more resource blocks 440 that a UE receives and the higher the modulation scheme, the higher the data rate for the UE.

In an aspect, the DL-RS may be positioning reference signals (PRS). A base station may transmit radio frames (e.g., radio frames 410), or other physical layer signaling sequences, supporting PRS signals according to frame configurations either similar to, or the same as that, shown in FIG. 4, which may be measured and used for a UE (e.g., any of the UEs described herein) position estimation. Other types of wireless nodes (e.g., a DAS, RRH, UE, AP, etc.) in a wireless communications network may also be configured to transmit PRS signals configured in a manner similar to (or the same as) that depicted in FIG. 4.

A collection of resource elements that are used for transmission of PRS is referred to as a "PRS resource." The collection of resource elements can span multiple PRBs in the frequency domain and N (e.g., 1 or more) consecutive symbol(s) 460 within a slot 430 in the time domain. In a given OFDM symbol 460, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and may be associated with a particular TRP (identified by a cell ID) transmitted by an antenna panel of a base station. A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS occasion" is one instance of a periodically repeated time window (e.g., a group of one or more consecutive slots) where PRS are expected to be transmitted. A PRS occasion may also be referred to as a "PRS positioning occasion," a "positioning occasion," or simply an "occasion."

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, navigation reference signals (NRS) in 5G, tracking reference signals (TRS), cell-specific reference signals (CRS), channel state information reference signals (CSI-RS), demodulation reference signals (DMRS), primary synchronization signals (PSS), secondary synchronization signals (SSS), SRS, etc.

In 5G NR, there may not be precise timing synchronization across the network. Instead, it may be sufficient to have coarse time-synchronization across gNBs (e.g., within a cyclic prefix (CP) duration of the OFDM symbols). RTT-based methods generally only need coarse timing synchronization, and as such, are a preferred positioning method in NR.

In a network-centric RTT estimation, the serving base station instructs the UE to scan for/receive the RTT measurement signals from two or more neighboring base stations (and typically the serving base station, as at least three base stations are needed). The one or more base stations transmit RTT measurement signals on low reuse resources (i.e., resources used by the base station to transmit system information), allocated by the network (e.g., location server 230, LMF 270). The UE records the arrival time (also referred to as a receive time, a reception time, a time of reception, or a time of arrival) of each RTT measurement signal relative to the UE's current downlink timing (e.g., as derived by the UE from a downlink signal received from its serving base station), and transmits a common or individual RTT Response message(s) to the one or more base stations (e.g., when instructed by its serving base station) and may include each of the measured arrival times in a payload of the RTT response message(s).

A UE-centric RTT estimation is similar to the network-based method, except that the UE transmits uplink RTT measurement signal(s) (e.g., when instructed by a serving base station or location server), which are received by multiple base stations in the neighborhood of the UE. Each base station responds with a downlink RTT response message, which may include the arrival time of the RTT measurement signal at the gNB in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the arrival (or receive) time(s) of the first message(s) or signal(s) in the RTT response message(s) payload.

Figure 5:
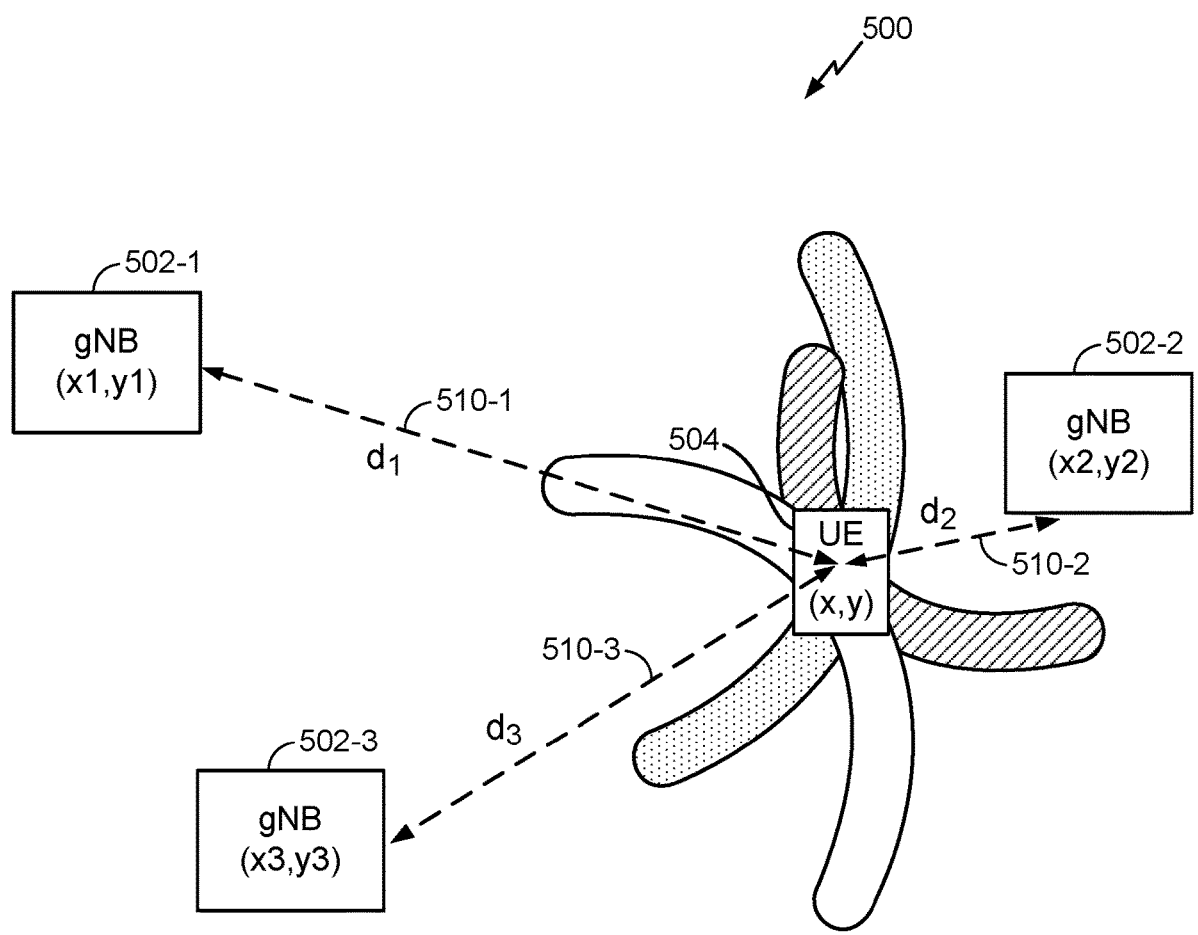
FIG. 5 is a diagram illustrating an exemplary technique for determining a position of a UE using information obtained from a plurality of base stations.

FIG. 5 illustrates an exemplary wireless communications system 500 according to aspects of the disclosure. In the example of FIG. 5, a UE 504 (which may correspond to any of the UEs described herein) is attempting to calculate an estimate of its position, or assist another entity (e.g., a base station or core network component, another UE, a location server, a third party application, etc.) to calculate an estimate of its position. The UE 504 may communicate wirelessly with a plurality of base stations 502-1, 502-2, and 502-3 (collectively, base stations 502, and which may correspond to any of the base stations described herein) using RF signals and standardized protocols for the modulation of the RF signals and the exchange of information packets. By extracting different types of information from the exchanged RF signals, and utilizing the layout of the wireless communications system 500 (i.e., the base stations' locations, geometry, etc.), the UE 504 may determine its position, or assist in the determination of its position, in a predefined reference coordinate system. In an aspect, the UE 504 may specify its position using a two-dimensional coordinate system; however, the aspects disclosed herein are not so limited, and may also be applicable to determining positions using a three-dimensional coordinate system, if the extra dimension is desired. Additionally, while FIG. 5 illustrates one UE 504 and three base stations 502, as will be appreciated, there may be more UEs 504 and more base stations 502.

To support position estimates, the base stations 502 may be configured to broadcast reference RF signals (e.g., PRS, NRS, CRS, TRS, CSI-RS, PSS, or SSS, etc.) to UEs 504 in their coverage area to enable a UE 504 to measure characteristics of such reference RF signals. For example, the UE 504 may measure the time of arrival (ToA) of specific reference RF signals (e.g., PRS, NRS, CRS, CSI-RS, etc.) transmitted by at least three different base stations 502-1, 502-2, and 502-3 and may use the RTT positioning method to report these ToAs (and additional information) back to the serving base station 502 or another positioning entity (e.g., location server 230, LMF 270).

In an aspect, although described as the UE 504 measuring reference RF signals from a base station 502, the UE 504 may measure reference RF signals from one of multiple cells supported by a base station 502. Where the UE 504 measures reference RF signals transmitted by a cell supported by a base station 502, the at least two other reference RF signals measured by the UE 504 to perform the RTT procedure would be from cells supported by base stations 502 different from the first base station 502 and may have good or poor signal strength at the UE 504.

In order to determine the position (x, y) of the UE 504, the entity determining the position of the UE 504 needs to know the locations of the base stations 502, which may be represented in a reference coordinate system as $(x_k, y_k)$, where k=1, 2, 3 in the example of FIG. 5. Where one of the base stations 502 (e.g., the serving base station) or the UE 504 determines the position of the UE 504, the locations of the involved base stations 502 may be provided to the serving base station 502 or the UE 504 by a location server with knowledge of the network geometry (e.g., location server 230, LMF 270). Alternatively, the location server may determine the position of the UE 504 using the known network geometry.

Either the UE 504 or the respective base station 502 may determine the distance 510 ($d_k$, where k=1, 2, 3) between the UE 504 and the respective base station 502. Specifically, the distance 510-1 between the UE 504 and base station 502-1 is $d_1$, the distance 510-2 between the UE 504 and base station 502-2 is $d_2$, and the distance 510-3 between the UE 504 and base station 502-3 is $d_3$. In an aspect, determining the RTT of signals exchanged between the UE 504 and any base station 502 can be performed and converted to a distance 510 ($d_k$). As discussed further below, RTT techniques can measure the time between sending a signaling message (e.g., reference RF signals) and receiving a response. These methods may utilize calibration to remove any processing delays. In some environments, it may be assumed that the processing delays for the UE 504 and the base stations 502 are the same. However, such an assumption may not be true in practice.

Once each distance 510 is determined, the UE 504, a base station 502, or the location server (e.g., location server 230, LMF 270) can solve for the position (x, y) of the UE 504 by using a variety of known geometric techniques, such as, for example, trilateration. From FIG. 5, it can be seen that the position of the UE 504 ideally lies at the common intersection of three semicircles, each semicircle being defined by radius $d_k$ and center $(x_k, y_k)$, where k=1, 2, 3.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE 504 from the location of a base station 502). The intersection of the two directions at or near the point (x, y) can provide another estimate of the location for the UE 504.

A position estimate (e.g., for a UE 504) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 6A:
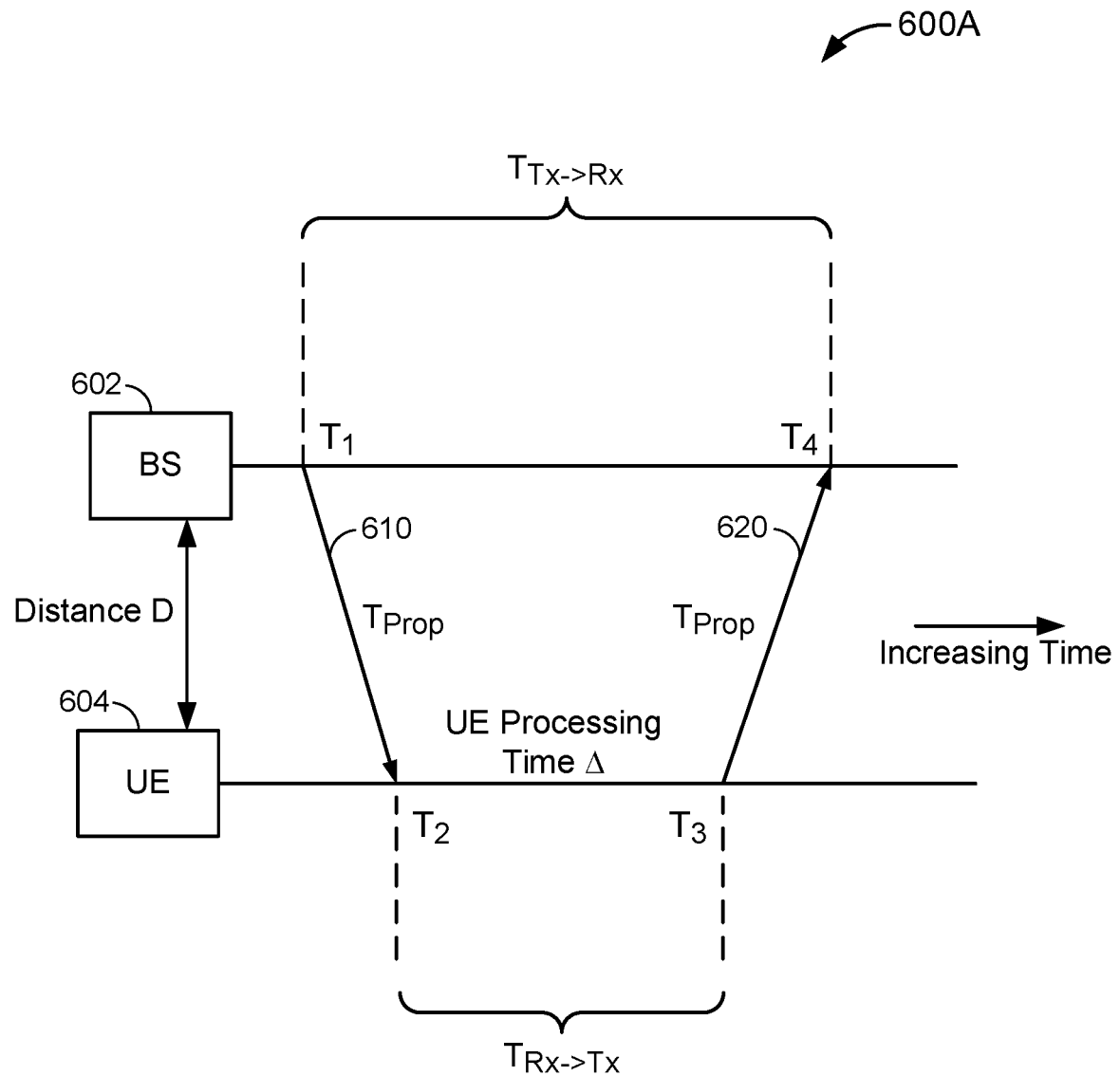
FIGS. 6A and 6B are diagrams showing exemplary timings of RTT measurement signals exchanged between a base station and a UE, according to aspects of the disclosure.

FIG. 6A is an exemplary diagram 600A showing exemplary timings of RTT measurement signals exchanged between a base station 602 (e.g., any of the base stations described herein) and a UE 604 (e.g., any of the UEs described herein), according to aspects of the disclosure. In the example of FIG. 6A, the base station 602 sends an RTT measurement signal 610 (e.g., PRS, NRS, CRS, CSI-RS, etc.) to the UE 604 at time $T_1$. The RTT measurement signal 610 has some propagation delay $T_{Prop}$ as it travels from the base station 602 to the UE 604. At time $T_2$ (the ToA of the RTT measurement signal 610 at the UE 604), the UE 604 receives/measures the RTT measurement signal 610. After some UE processing time, the UE 604 transmits an RTT response signal 620 at time $T_3$. After the propagation delay $T_{Prop}$, the base station 602 receives/measures the RTT response signal 620 from the UE 604 at time $T_4$ (the ToA of the RTT response signal 620 at the base station 602).

In order to identify the ToA (e.g., $T_2$) of an RF signal (e.g., an RTT measurement signal 610) transmitted by a given network node, the receiver (e.g., UE 604) first jointly processes all the resource elements (REs) on the channel on which the transmitter (e.g., base station 602) is transmitting the RF signal, and performs an inverse Fourier transform to convert the received RF signals to the time domain. The conversion of the received RF signals to the time domain is referred to as estimation of the channel energy response (CER). The CER shows the peaks on the channel over time, and the earliest "significant" peak should therefore correspond to the ToA of the RF signal. Generally, the receiver will use a noise-related quality threshold to filter out spurious local peaks, thereby presumably correctly identifying significant peaks on the channel. For example, the UE 604 may chose a ToA estimate that is the earliest local maximum of the CER that is at least X decibels (dB) higher than the median of the CER and a maximum Y dB lower than the main peak on the channel. The receiver determines the CER for each RF signal from each transmitter in order to determine the ToA of each RF signal from the different transmitters.

The RTT response signal 620 may explicitly include the difference between time $T_3$ and time $T_2$ (i.e., $T_{Rx \to Tx}$). Alternatively, it may be derived from the timing advance (TA), i.e., the relative UL/DL frame timing and specification location of UL reference signals. (Note that the TA is usually the RTT between the base station 602 and the UE 604, or double the propagation time in one direction.) Using this measurement and the difference between time $T_4$ and time $T_1$ (i.e., $T_{Tx \to Rx}$), the base station 602 can calculate the distance to the UE 604 as:

$$d = \frac{1}{2c}(T_{Tx \to Rx} - T_{Rx \to Tx}) = \frac{1}{2c}(T_2 - T_1) \mp \frac{1}{2c}(T_4 - T_3)$$

where c is the speed of light.

Figure 6B:
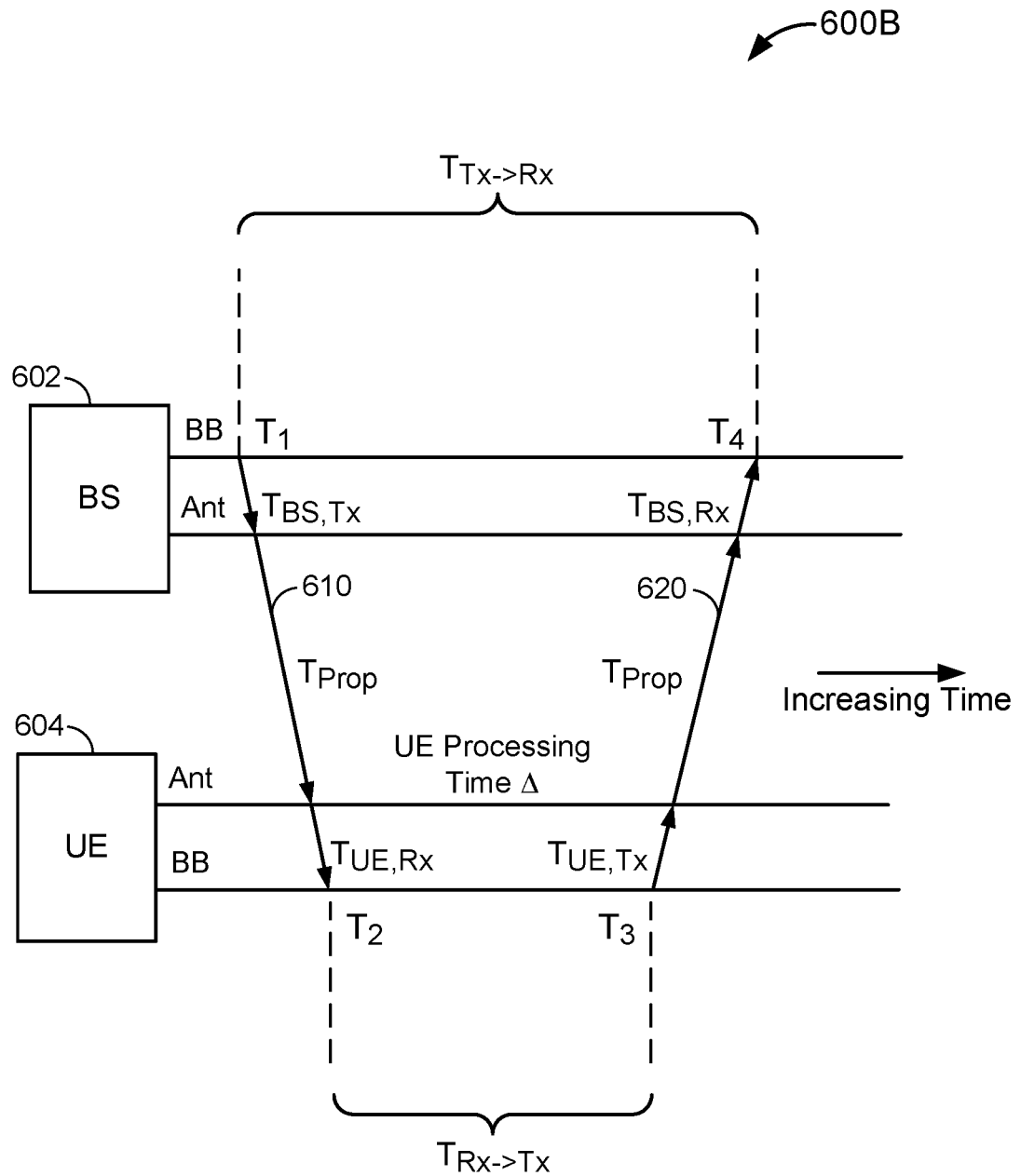

FIG. 6B is an exemplary diagram 600B showing exemplary timings of RTT measurement signals exchanged between the base station 602 and the UE 604, according to aspects of the disclosure. The diagram 600B is similar to the diagram 600A, except that it includes processing delays that occur at both the base station 602 and the UE 604 when transmitting and receiving the RTT measurement signal and RTT response signal.

Specifically, on the base station 602 side, there is a transmission delay of $T_{gNB,Tx}$ between the time the base station's 602 baseband (BB) generates the RTT measurement signal 610 and the antenna (Ant) transmits the RTT measurement signal 610. On the UE 604 side, there is a reception delay of $T_{UE,Rx}$ between the time the UE's 604 antenna receives/detects the RTT measurement signal 610 and the time the baseband processes the RTT measurement signal 610. Similarly, for the RTT response signal 620, there is a transmission delay of $T_{UE,Tx}$ between the time the UE's 604 baseband generates the RTT response signal 620 and the antenna transmits the RTT response signal 620. On the base station 602 side, there is a reception delay of $T_{gNB,Rx}$ between the time the base station's 602 antenna receives/detects the RTT response signal 620 and the time the baseband processes the RTT response signal 620.

Generally, the UE 604 calibrates its RF front end (RFFE) group delays and compensates for them so that the RTT report reflects the delay from its antennas. The base station 602 subtracts the calibrated RFFE group delays to determine the final distance between the base station 602 and the UE 604.

The present disclosure describes techniques for enabling RTT procedures with one or more "listening-only" nodes. In the basic RTT procedure, described above with reference to FIGS. 5 to 6B, it is necessary to have transmission and reception of RF signals from at least three base stations to calculate a position estimate of the UE. Further, pruning or averaging across multiple observations can improve the position estimate, meaning it is beneficial for more than three base stations to be involved. However, sending and receiving RTT messages between multiple base stations and the UE may utilize a significant amount of bandwidth and processing power at the UE.

It would therefore be beneficial to be able to obtain additional distance measurements without the need for the UE to process additional transmissions from other base stations. To accomplish this, a "listening-only" node (e.g., a nearby base station) with a known position in the network can be configured to listen to the RTT measurement signals transmitted by nearby base stations (with known positions) and the RTT response signals transmitted by the UE (with an unknown position). Note that the listening node is not required to be tightly synchronized with the base stations to which it is listening.

Figure 7:
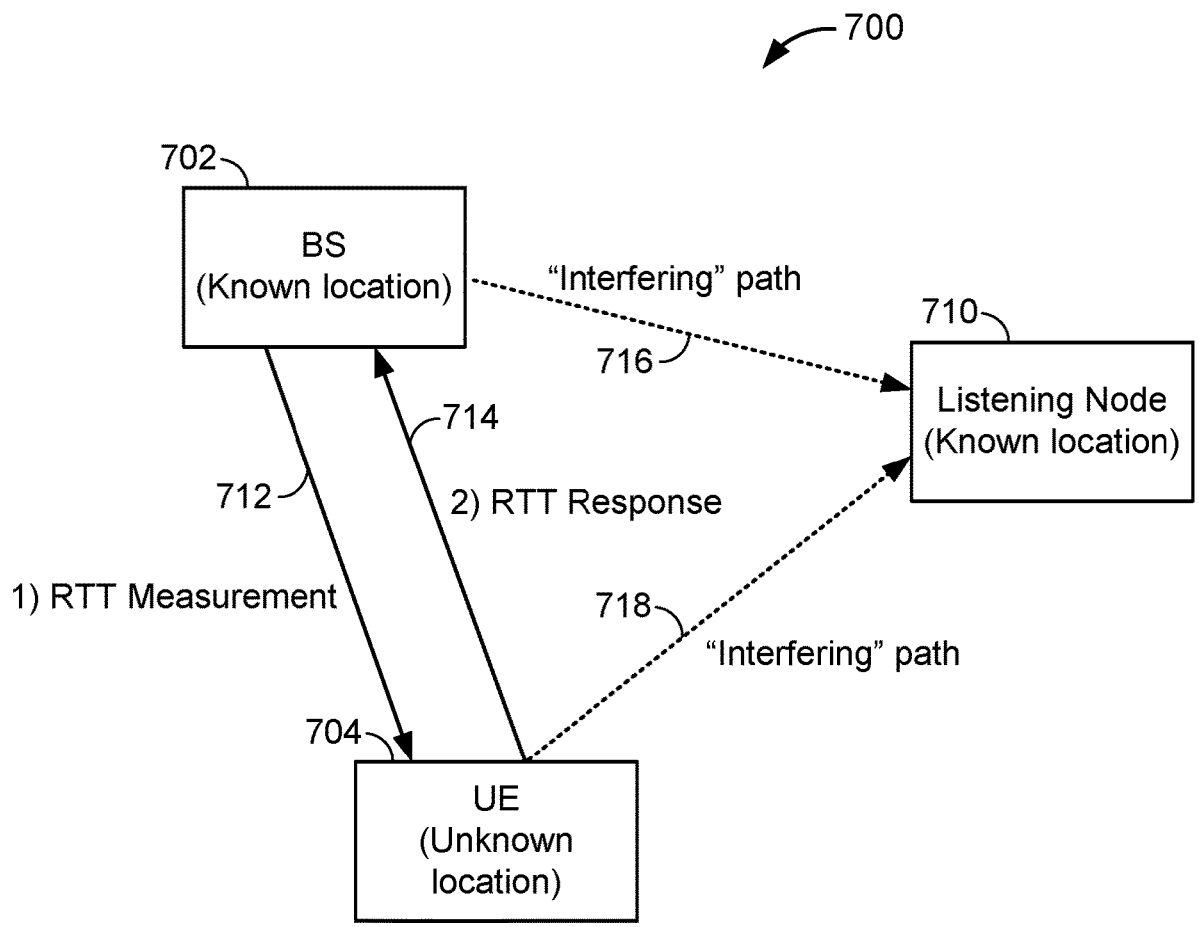
FIG. 7 illustrates an exemplary wireless network comprising a base station, a UE, and a listening node, according to aspects of the disclosure.

FIG. 7 illustrates an exemplary wireless network 700 comprising a base station 702 (e.g., any of the base stations described herein), a UE 704 (e.g., any of the UEs described herein), and a listening node (LN) 710 (e.g., any of the base stations described herein, or a UE with a known position), according to aspects of the disclosure. As illustrated in FIG. 7, the base station 702 (which may be the serving base station of the UE) sends an RTT measurement signal 712 to the UE 704 (having an unknown location). The UE 704 responds with an RTT response signal 714. Because of the multipath propagation of RF signals, the listening node 710, being within wireless communication range of the UE 704 and the base station 702, receives both the RTT measurement signal 712 (as RTT measurement signal 716) and the RTT response signal 714 (as RTT response signal 718). However, the listening node 710 may receive the RTT measurement signal 716 and RTT response signal 718 with some level of interference. This RTT process is described in greater detail with reference to FIG. 8.

Figure 8:
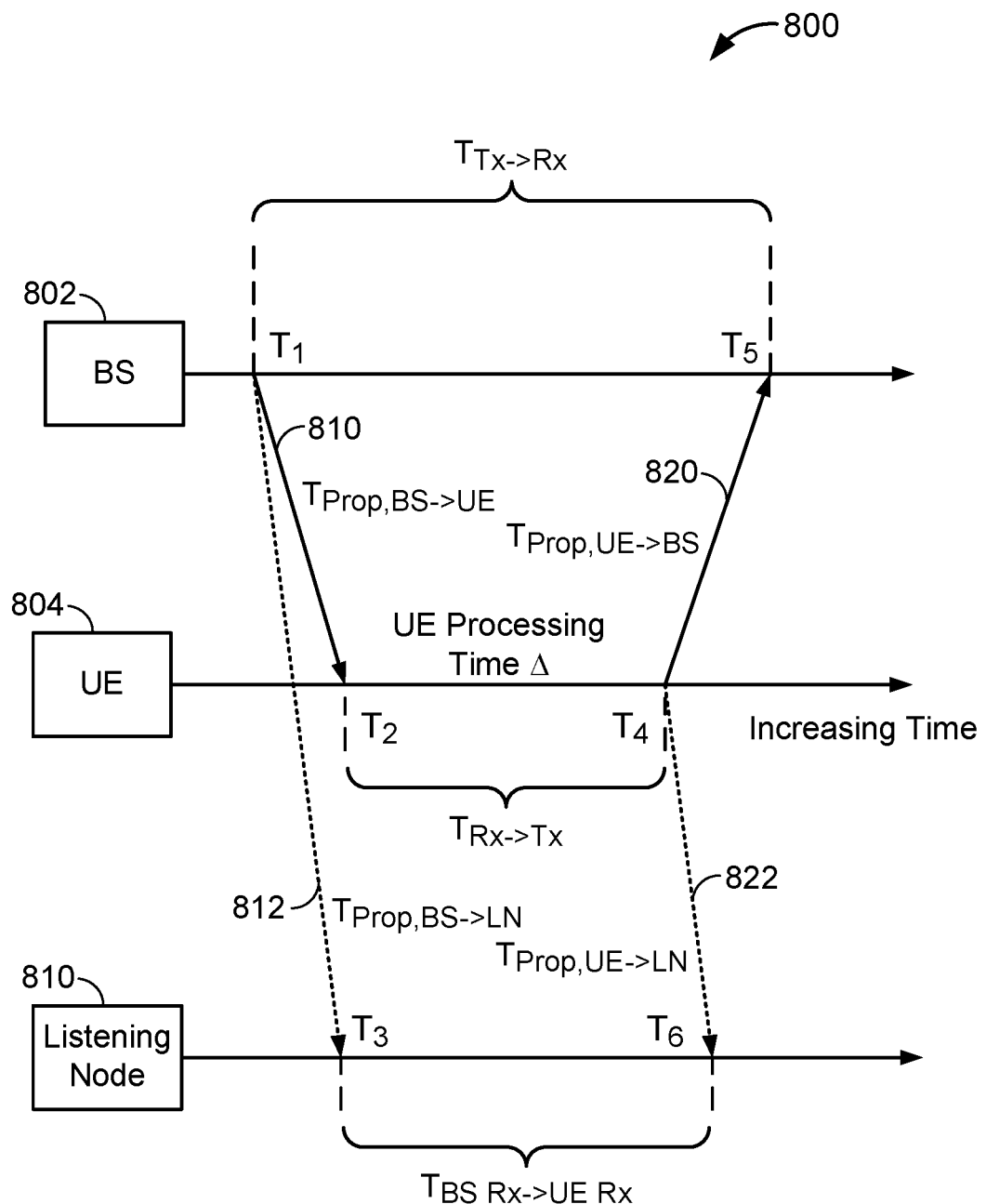
FIG. 8 is an exemplary diagram showing exemplary timings of RTT measurement signals exchanged between a base station, a UE, and a listening node, according to aspects of the disclosure.

FIG. 8 is a diagram 800 showing exemplary timings of RTT measurement signals exchanged between a base station 802 (e.g., any of the base stations described herein), a UE 804 (e.g., any of the UEs described herein) served by the base station 802, and a listening node (LN) 810, according to aspects of the disclosure. In the example of FIG. 8, the base station 802 transmits an RTT measurement signal (e.g., PRS, NRS, CRS, CSI-RS, etc.) at time $T_1$, which is received at the UE 804 as RTT measurement signal 810 at time $T_2$ (the ToA of the RTT measurement signal 810 at the UE 804). The RTT measurement signal 810 has some propagation delay $T_{Prop,BS \to UE}$ as it travels from the base station 802 to the UE 804. The RTT measurement signal transmitted at time $T_1$ is also received/measured at the listening node 810 as RTT measurement signal 812, but at time $T_3$ (the ToA of the RTT measurement signal 812 at the listening node 810). The RTT measurement signal 812 has some propagation delay $T_{Prop,BS \to LN}$ as it travels from the base station 802 to the listening node 810.

After some UE processing time, the UE 804 transmits an RTT response signal (e.g., an SRS) at time $T_4$, which, after a propagation delay $T_{Prop,UE \to BS}$, is received/measured at the base station 802 as RTT response signal 820 at time $T_5$ (the ToA of the RTT response signal 820 at the base station 802). At time $T_6$, the listening node 810 also receives/measures the RTT response signal, represented as RTT response signal 822. The RTT response signal 822 has some propagation delay $T_{Prop,UE \to LN}$ as it travels from the UE 804 to the listening node 810. As described above, the RTT response signal 820 may include a report of the time $T_{Rx \to Tx}$ at the UE 804.

The listening node 810 determines the time difference between the ToA of the RTT measurement signal 812 (i.e., time $T_3$) and the ToA of the RTT response signal 822 (i.e., time $T_6$), represented as $T_{BS\text{-}RX \to UE\text{-}RX}$. The listening node 810 sends a measurement report to the positioning entity (e.g., base station 802, UE 804, location server 230, LMF 270) reporting the $T_{BS\text{-}RX \to UE\text{-}RX}$. This report may be sent over-the-air or through backhaul signaling.

The distance from the listening node 810 to the UE 804 can then be calculated. The propagation of the RTT response signal 822 can be represented as:

$$T_{Prop,UE \to LN} = T_{BS\text{-}Rx \to UE\text{-}Rx} + T_{Prop,BS \to LN} - (T_{Rx \to Tx} + T_{Prop,BS \to UE})$$

The basic RTT procedure (described above with reference to FIGS. 5 to 6B) can solve for $T_{Prop,BS \to UE}$. The UE's 804 measurement report includes $T_{Rx \to Tx}$, the listening node's 810 measurement report includes $T_{BS\text{-}Rx \to UE\text{-}Rx}$, and $T_{Prop,BS \to LN}$ can be obtained from the known locations of the base station 802 and the listening node 810 or a dedicated calibration procedure (e.g., an RTT procedure) between the base station 802 and the listening node 810.

If the propagation delay from the base station 802 to the listening node 810 is derived from the known locations of the base station 802 and the listening node 810, it is assumed that the RTT measurement signal 812 is received over a line of sight (LOS) path. Alternatively, if the propagation delay from the base station 802 to the listening node 810 is derived from a dedicated calibration procedure between the base station 802 and the listening node 810, the dedicated calibration procedure may be an RTT procedure between the base station 802 and the listening node 810. As discussed above, an RTT procedure enables the distance and propagation delay between two nodes to be calculated. In that way, the listening node 810 is not required to be tightly synchronized with the base station 802.

In an aspect, a location server (e.g., location server 230, LMF 270) may coordinate which neighboring base stations to the UE should serve as listening nodes. In general, they would be base stations within good signal range of the serving base station (e.g., base station 802) and the UE and in LOS of the serving base station, although neither of these is necessary. In addition, the described RTT method should be transparent to the UE. The location server (or the serving base station) may simply instruct the UE to perform an RTT procedure with only the serving base station.

The RTT estimation procedures disclosed herein can be extended to massive MIMO systems and to the EHF region of the spectrum (e.g., mmW). As discussed above with reference to FIG. 1, in mmW band systems, as well as massive MIMO systems in any band, base stations (e.g., gNBs) use transmission/reception beamforming to extend signal coverage to the cell edge.

Figure 9:
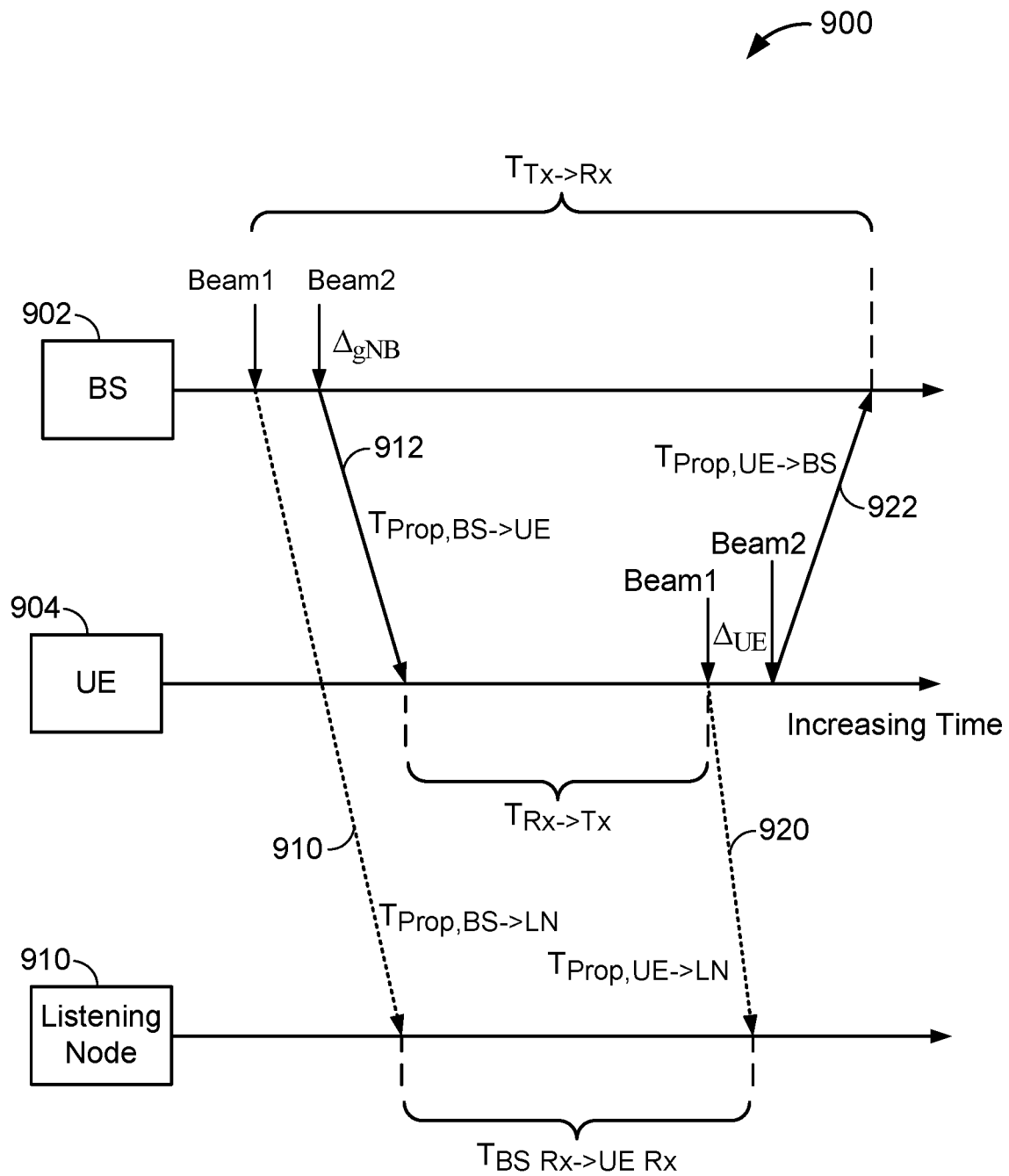
FIG. 9 is a diagram showing exemplary timings of RTT measurement signals exchanged between a base station, a UE, and a listening node, according to aspects of the disclosure.

The RTT estimation procedure disclosed herein can be extended to a multi-beam system by configuring the listening node to listen for multiple reference RF signal identifiers (e.g., PRS resource set identifiers) or multiple beam identifiers and to include the respective identifier in the report to the positioning entity (e.g., the serving base station, the location server, the UE). FIG. 9 is a diagram 900 showing exemplary timings of RTT measurement signals exchanged between a base station 902 (e.g., any of the base stations described herein), a UE 904 served by the base station 902, and a listening node 910, according to aspects of the disclosure. In the example of FIG. 9, the base station 902 transmits a first RTT measurement signal 910 (e.g., PRS, NRS, CRS, CSI-RS, etc.) on a first beam ("beam1") and a second RTT measurement signal 912 on a second beam ("beam2"). The listening node 910 receives/measures the first RTT measurement signal 910 on the first beam and the UE 904 receives/measures the second RTT measurement signal 912 on the second beam. The first RTT measurement signal 910 has some propagation delay $T_{Prop,BS \to LN}$ as it travels from the base station 902 to the listening node 910. The second RTT measurement signal 912 has some propagation delay $T_{Prop,BS \to UE}$ as it travels from the base station 902 to the UE 904.

After some UE processing time, the UE 904 transmits a first RTT response signal 920 on a first beam ("beam1") and a second RTT response signal 922 on a second beam ("beam2"). In an aspect, the beams may carry SRS. The listening node 910 receives/measures the first RTT response signal 920 on the first beam and the base station 902 receives/measures the second RTT response signal 922 on the second beam. The first RTT response signal 920 has some propagation delay $T_{Prop,UE \to LN}$ as it travels from the UE 904 to the listening node 910. The second RTT measurement signal 922 has some propagation delay $T_{Prop,UE \to Bs}$ as it travels from the UE 904 to the base station 902.

The first and second beams transmitted by the base station 902 and the UE 904 may be, for example, the first two beams of a beam sweep. Thus, in the example of FIG. 9, the listening node's 910 measurement of the RTT measurement signal 910 is from the start of the base station's 902 beam sweep, and similarly, its measurement of the RTT response signal 920 is from the start of the UE's 904 beam sweep. In addition, although both the base station 902 and the UE 904 are shown as transmitting multiple beams, it may be that only one or the other transmits multiple beams.

When reporting to the positioning entity (e.g., location server 230, LMF 270, base station 902, UE 904), the listening node 910 includes the beam identifier of the received beam (e.g., "beam1"). Likewise, when sending its report to the positioning entity, the UE 904 includes the beam identifier of the received beam (e.g., "beam2"). Based on these beam identifiers and the configuration details for the beam sweep, the positioning entity can solve the RTT between the UE 904 and the listening node 910.

Specifically, it can be assumed that the time between the beams of the base station' 902 beam sweep (e.g., beam1, beam2), represented as $\Delta_{gNB}$, is known from the beam sweep configuration, and that the time between the beams of the UE's 904 beam sweep (e.g., beam1, beam2), represented as $\Delta_{UE}$, is also known from the beam sweep configuration. The network (e.g., location server 230, LMF 270, serving base station 902) starts measuring the time from the start of these beam sweeps. In the example of FIG. 9, the UE 904 only detects "beam2" from the base station 902 and therefore indicates that "beam2" is the starting point (i.e., "Rx") for the measurement $T_{Rx \to Tx}$ (by including the beam or reference RF signal identifier of "beam2" in the measurement report), and that the ending point (i.e., "Tx") is the start of its (SRS) beam sweep, i.e., the transmission time of "beam1."

In the example of FIG. 9, the base station 902 only detects the second beam of the UE beam sweep, i.e., "beam2," and measures the time to reception of that beam. The listening node 910 detects the first beam (i.e., "beam1") of the base station's 902 beam sweep and the first beam (i.e., "beam1") of the UE's beam sweep. The listening node 910 reports, to the network, the identifiers of the detected beams along with the measurement $T_{gNB\ Rx \to UE\ Rx}$.

A basic RTT procedure between the UE 904 and the base station 902 accounts for beam sweeping using the reference RF signal identifiers or beam identifiers and the known 4 for RTT as follows:

$$T_{Prop,BS \to UE} = T_{Tx \to Rx} - T_{Rx \to Tx} - \Delta_{gNB} - \Delta_{UE}$$

The report from the listening node 910 is incorporated with reference RF signal identifier or beam identifier information to solve for the propagation delay between the UE 904 and the listening node 910 as follows:

$$T_{Prop,UE \to LN} = (T_{BS\text{-}Rx \to UE\text{-}Rx} + T_{Prop,BS \to LN})^{1,2} - (T_{Rx \to Tx} + \Delta_{gNB} + T_{Prop,BS \to UE})^3$$

Note that if the listening node 910 only hears the second UE 904 beam (i.e., "beam2"), then the above equation is modified to include $+\Delta_{UE}$. If the listening node 910 only hears the second base station 902 beam (i.e., "beam2"), then the above equation is modified to include $+\Delta_{gNB}$. If the UE 904 only hears the first base station 902 beam (i.e., "beam1"), then the above equation is modified to remove $\Delta_{gNB}$.

Figure 10:
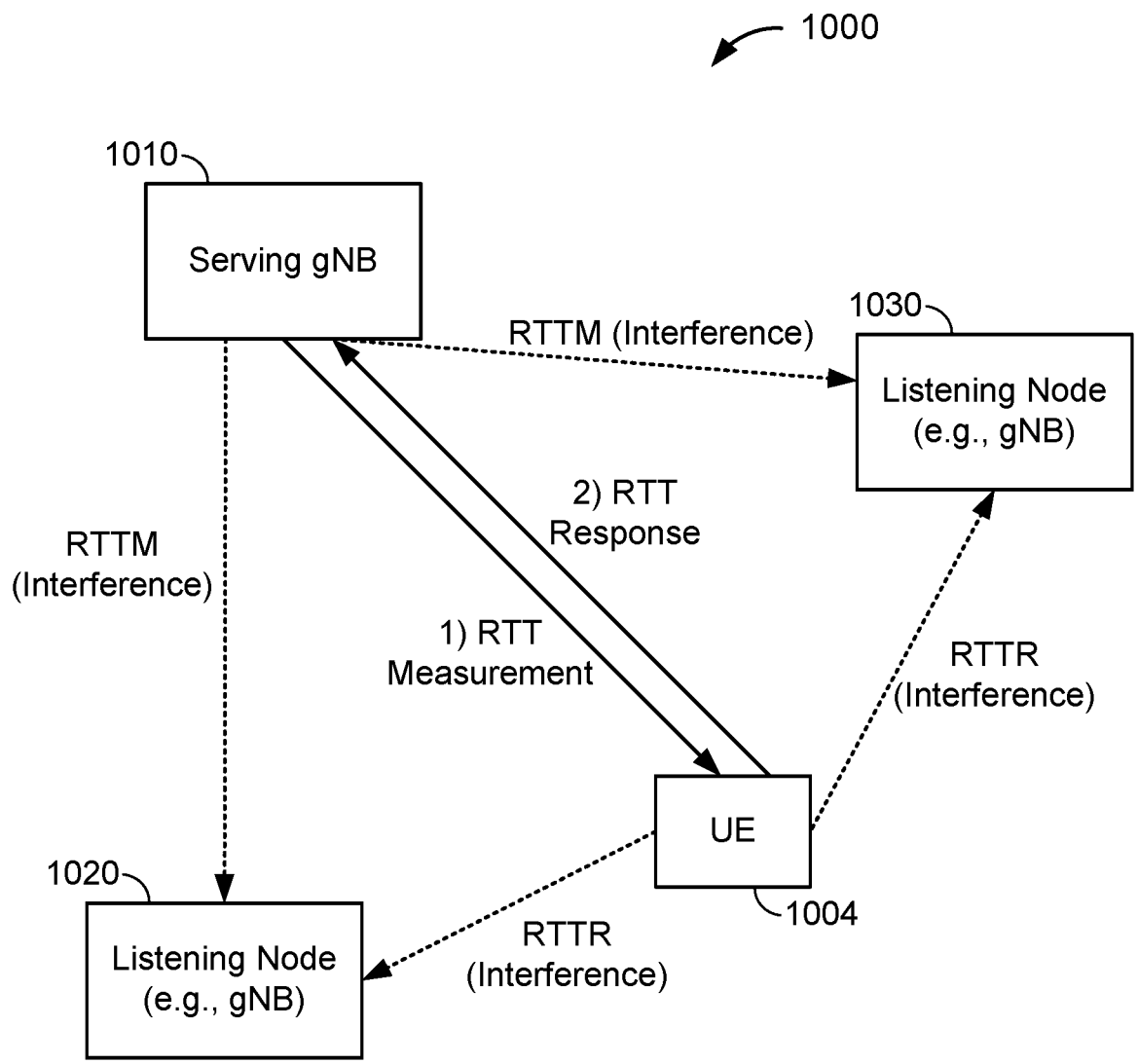
FIG. 10 illustrates an exemplary RTT procedure performed between a serving base station, a UE, and at least two other listening nodes, according to aspects of the disclosure.

There are various implications for a gNB implementation of the techniques described herein. For time-division duplex (TDD) networks (especially at the macro cell level), the downlink transmissions of a gNB can strongly interfere with the uplink transmissions of neighboring gNBs. This implies that such gNBs are good candidates to be configured as listening nodes for the RTT techniques described herein. For example, as illustrated in FIG. 10, the basic RTT procedure described above with reference to FIGS. 5 to 6B need only be performed between a serving gNB 1010 and a UE 1004, and the at least two other network nodes needed for position estimation could be gNB listening nodes 1020 and 1030. The gNB listening nodes' 1020 and 1030 measurement reports would be sent to the positioning entity (e.g., location server 230, LMF 270, serving gNB 1010, UE 1004), as described above with reference to FIGS. 8 and 9. This can significantly reduce the reporting overhead in the network.

Note that although FIG. 10 illustrates only three gNBs, as will be appreciated, there may be more than three gNBs. When there are more than three gNBs, the positioning entity can average multiple observations, or can prune out poor/weak observations, to improve the position estimate. Alternatively, each gNB can make multiple observations to permit the positioning entity to average or prune observations. In addition, the detected AoA or AoD of the RTT signals can be used to further refine the position estimate.

FIG. 10 also illustrates an example application for single gNB positioning, in which a single gNB 1010 has been installed in a building (e.g., a home, office, retail outlet, warehouse, etc.) to provide basic data services and additional listening nodes 1020 and 1030 have been installed to provide positioning services. The listening nodes 1020 and 1030 may send positioning reports to the gNB 1010 over the air on the same channel on which the gNB 1010 operates or an off-frequency. In an aspect, the listening nodes 1020 and 1030 may be other UEs with known locations, such as IoT devices, rather than dedicated nodes, to reduce the cost of such a deployment.

Additional considerations for such a deployment include that the listening nodes 1020 and 1030 may perform a simple RTT interaction with the gNB 1010 and each other for initial x, y, z calibration. Also, additional listening nodes could be installed for greater precision.

Where a UE is configured as a listening node, the UE may be configured to listen for RTT measurement signals from neighboring base stations and the RTT report signal from the target UE to be positioned. Such a UE would only share the measurement report with the positioning entity. This report may be sent over-the-air to the positioning entity or to each serving base station designated to each listening UE. This may also be extended to child nodes of an integrated access and backhaul (IAB) system.

In an aspect, a UE with an unknown position could request to become a "listening-only" node by sending its uplink reference signal and downlink reference signal configuration information to another entity (e.g., the positioning entity). In that case, there could be multiple entities working together as listening nodes to help the positioning entity estimate the location of a specific UE. The positioning equation could be rewritten as follows:

$$\frac{2(d_{UE} - d_{LN})}{c} = LN_{Rx1-Rx2} - UE_{Rx-Tx}$$

which means that this method could be used to estimate the relative distance of two nodes (UE and listening node) with respect to a common reference point.

The following provides additional details of the $LN_{Rx1-Rx2}$ signaling. The listening node needs to be configured with a positioning reference RF signal configuration and an uplink SRS configuration during which it is only expected to listen. It should report the difference between the two receptions to the positioning entity (e.g., location server 230, LMF 270) using the same accuracy and step size as the UE Tx-Rx report. The listening node should also report the cell identifier (or PRS resource (set) identifier) and the SRS identifier together with the listening node's reception-to-reception (RX1-RX2) timing. The listening node should also report its own position if this is not available to the positioning entity. The listening node should report the timestamp (e.g., system frame number (SFN)) during which the measurement is valid. It should also report the RSRP or RSRQ of one of the two receptions, or both, or an average.

In the case of UE-based positioning, if the listening node is another UE, the report is transmitted using the sidelink channels between the UEs. If the listening node is a gNB, however, the report is transmitted using the uplink PHY channels.

In an aspect, a listening node may be configured with multiple PRS and SRS configurations, and the listening node may attempt to detect all of them. Then, it may report to the positioning entity which PRS and SRS identifiers it was able to detect along with the quality of the measurements. This is relevant for multi-beam support, as discussed above with reference to FIG. 9.

Figure 11:
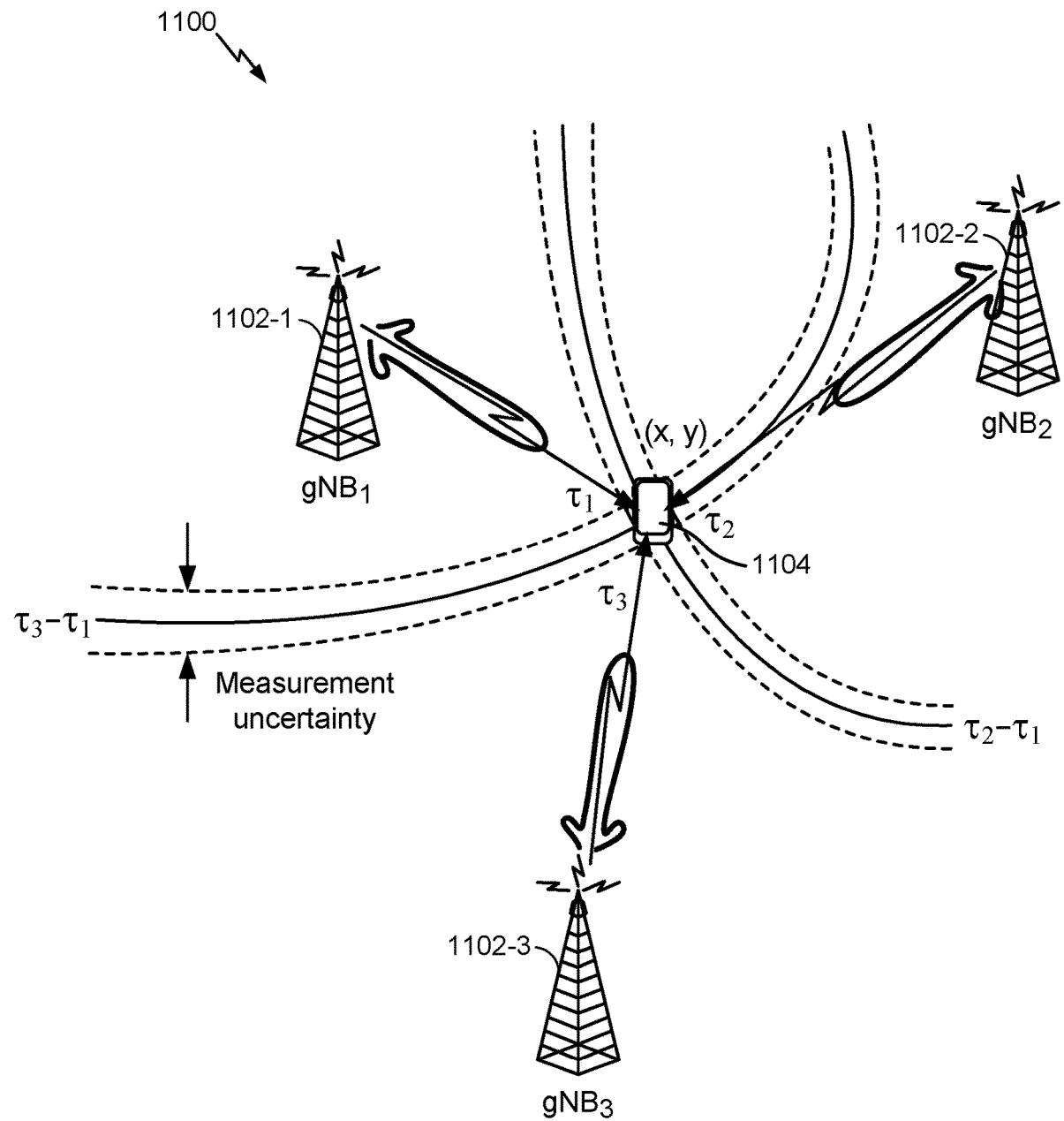
FIG. 11 is a diagram illustrating an exemplary technique for determining a position of a mobile device using information obtained from a plurality of base stations.

The present disclosure further provides techniques for using RTT measurement signals and responses for UTDOA. FIG. 11 illustrates an exemplary wireless communications system 1100 according to various aspects of the disclosure. In the example of FIG. 11, a UE 1104 (e.g., any of the UEs described herein) is attempting to calculate an estimate of its position, or assist another entity (e.g., a base station or core network component, another UE, a location server, a third party application, etc.) to calculate an estimate of its position. The UE 1104 may communicate wirelessly with a plurality of base stations 1102-1, 1102-2, and 1102-3 (collectively, base stations 1102, and which may correspond to any of the base stations described herein) using RF signals and standardized protocols for the modulation of the RF signals and the exchange of information packets. By extracting different types of information from the exchanged RF signals, and utilizing the layout of the wireless communications system 1100 (i.e., the base stations locations, geometry, etc.), the UE 1104 may determine its position, or assist in the determination of its position, in a predefined reference coordinate system. In an aspect, the UE 1104 may specify its position using a two-dimensional coordinate system; however, the aspects disclosed herein are not so limited, and may also be applicable to determining positions using a three-dimensional coordinate system, if the extra dimension is desired. Additionally, while FIG. 11 illustrates one UE 1104 and three base stations 1102, as will be appreciated, there may be more UEs 1104 and more base stations 1102.

To support position estimates, the base stations 1102 may be configured to broadcast reference RF signals (e.g., PRS, CRS, CSI-RS, synchronization signals, etc.) to UEs 1104 in their coverage area to enable a UE 1104 to measure characteristics of such reference RF signals. For example, the observed time difference of arrival (OTDOA) positioning method is a multilateration method in which the UE 1104 measures the time difference, known as a reference signal time difference (RSTD), between specific reference RF signals (e.g., PRS, CRS, CSI-RS, etc.) transmitted by different pairs of network nodes (e.g., base stations 1102, antennas of base stations 1102, etc.) and either reports these time differences to a location server, such as the location server 230 or LMF 270, or computes a location estimate itself from these time differences.

Generally, RSTDs are measured between a reference network node (e.g., base station 1102-1 in the example of FIG. 11) and one or more neighbor network nodes (e.g., base stations 1102-2 and 1102-3 in the example of FIG. 11). The reference network node remains the same for all RSTDs measured by the UE 1104 for any single positioning use of OTDOA and would typically correspond to the serving cell for the UE 1104 or another nearby cell with good signal strength at the UE 1104. In an aspect, where a measured network node is a cell supported by a base station, the neighbor network nodes would normally be cells supported by base stations different from the base station for the reference cell and may have good or poor signal strength at the UE 1104. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

The UE 1104 can measure and (optionally) report the RSTDs between reference RF signals received from pairs of base stations 1102. Using the RSTD measurements, the known absolute or relative transmission timing of each base station 1102, and the known position(s) of the transmitting antennas for the reference and neighboring base stations 1102, the UE's 1104 position may be calculated (e.g., by the UE 1104, the serving base station 1102, or the location server 230/LMF 270). More particularly, the RSTD for a neighbor base station "k" relative to a reference network node "Ref" may be given as (ToA$_k$-ToA$_{Ref}$), where the ToA values may be measured modulo one subframe duration (1 ms) to remove the effects of measuring different subframes at different times. In the example of FIG. 11, the measured time differences between the reference cell of base station 1102-1 and the neighboring cells of base stations 1102-2 and 1102-3 are represented as $\tau_2-\tau_1$ and $\tau_3-\tau_1$, where $\tau_1$, $\tau_2$, and $\tau_3$ represent the ToA of a reference RF signal from the transmitting antenna(s) of base station 1102-1, 1102-2, and 1102-3, respectively.

The UE 1104 may then convert the ToA measurements for different base stations 1102 to RSTD measurements and (optionally) send them to the positioning entity. An RSTD measurement may be represented as:

$$RSTD_{i,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$

Using (i) the RSTD measurements, (ii) the known absolute or relative transmission timing of each network node, (iii) the known position(s) of physical transmitting antennas for the reference and neighboring network nodes, and/or (iv) directional reference RF signal characteristics such as a direction of transmission, the UE's 1104 position may be determined.

UTDOA is a similar positioning method to OTDOA, but is based on uplink reference RF signals transmitted by the UE 1104 (e.g., SRS). Further, transmission and/or reception beamforming at the network node and/or UE 1104 can enable wideband bandwidth at the cell edge for increased precision. Beam refinements may also leverage channel reciprocity procedures in NR.

Unlike RTT positioning techniques, OTDOA positioning techniques rely on tight network synchronization across base stations 1102 so that time differences can be attributed largely to distance differences. This may be prohibitive when very high precision is needed.

Figure 12:
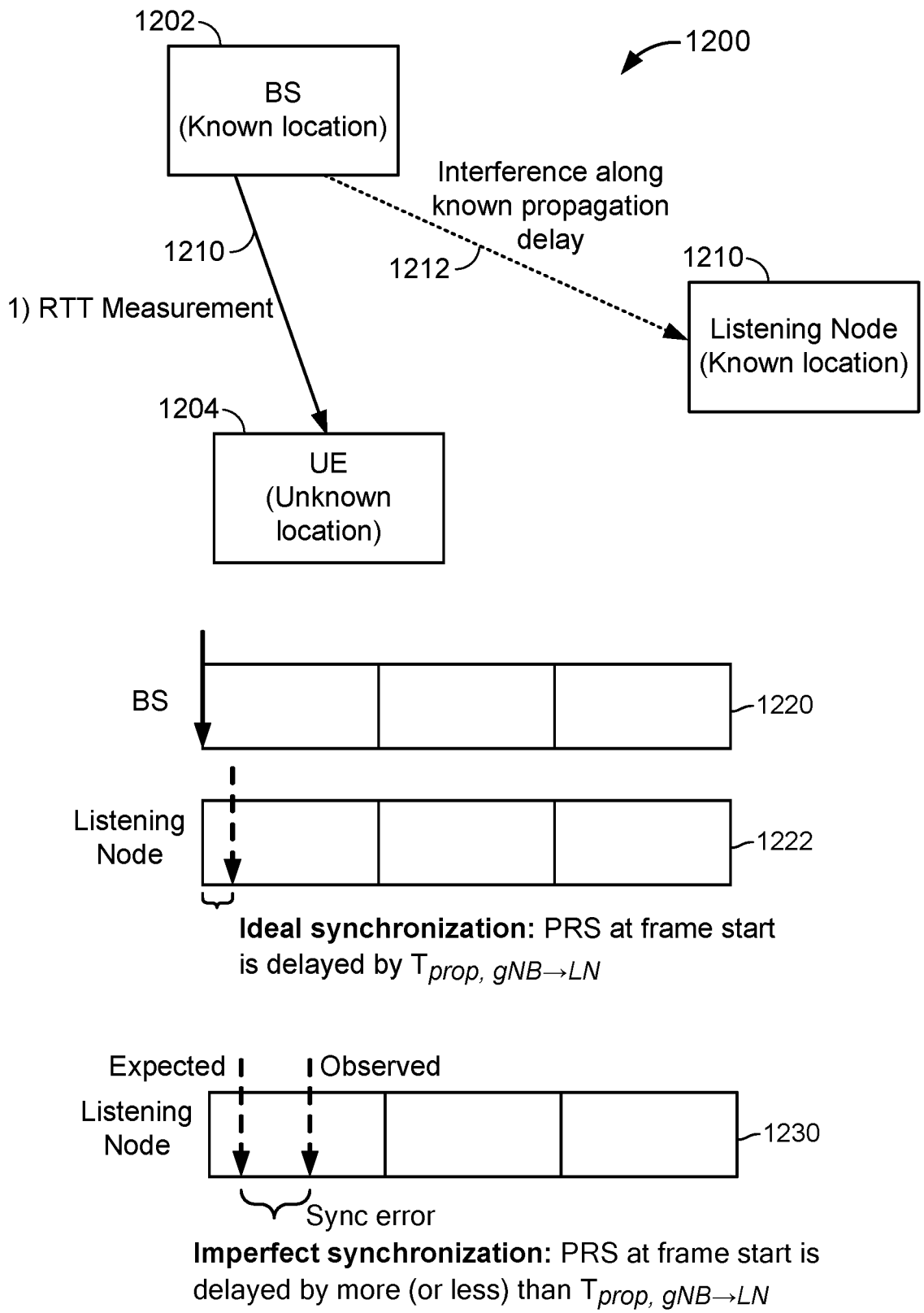
FIGS. 12 and 13 illustrate exemplary techniques for enabling uplink time difference of arrival (UTDOA) with listening nodes leveraging the RTT procedure between a base station and a UE, according to aspects of the disclosure.

FIG. 12 illustrates an exemplary technique for enabling UTDOA for RTT with listening nodes, according to aspects of the disclosure. In an aspect, the RTT measurement signal 1210 transmitted by the base station 1202 (e.g., any of the base stations described herein) to the UE 1204 (e.g., any of the UEs described herein) and heard, with some amount of interference, by a listening node 1210 (e.g., a neighboring base station or a UE with a known location) as RTT measurement signal 1212, can be used as a synchronization signal. That is, because of the multipath propagation of RF signals, the RTT measurement signal transmitted by the base station 1202 arrives at the UE 1204 as RTT measurement signal 1210 and at the listening node 1210 as RTT measurement signal 1212. Note that the propagation delay $T_{Prop,BS \to LN}$ between the base station 1202 and the listening node 1210 may be known or calculated as discussed above with reference to FIG. 8, and there may be some discernable interference of the RTT measurement signal 1212.

The propagation delay $T_{Prop,BS \to LN}$ can then be used to deduce the relative timing for frame boundaries between the base station 1202 and the listening node 1210. As illustrated by frame sequences 1220 and 1222, when there is ideal synchronization between the base station 1202 and the listening node 1210, the base station 1202 transmits a reference RF signal at the beginning of a subframe and the listening node 1210 receives the reference RF signal after the propagation delay $T_{Prop,BS \to LN}$. However, when there is imperfect synchronization, as illustrated by frame sequence 1230, the observed time of arrival of a reference RF signal may occur before or after the propagation delay $T_{Prop,BS \to LN}$ from the start of a subframe. In that case, the listening node 1210 can shift the start of its subframe timing such that the start of a subframe occurs $T_{Prop,BS \to LN}$ before the reference RF signal was received. That is, the listening node 1210 adjusts its clock such that the observed time matches the expected time. Once synchronized with the base station 1202, the listening node 1210 can be used by the UE 1204 (e.g., paired with the base station 1202) for OTDOA positioning procedures.

Figure 13:
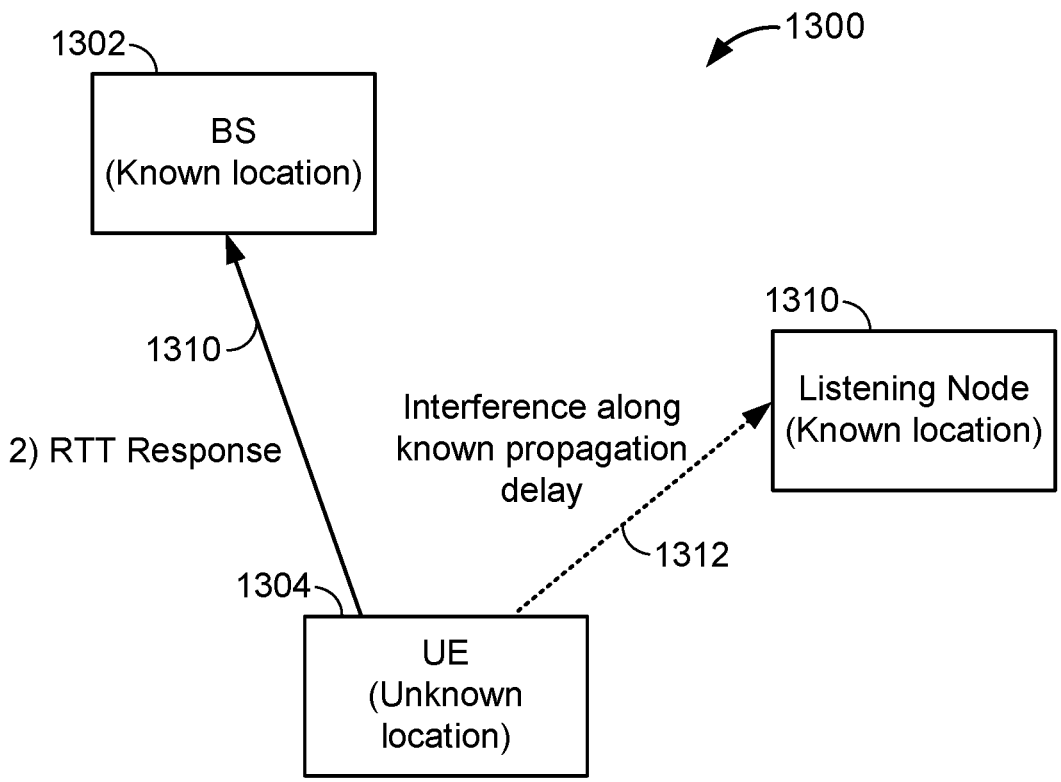
Figure 13:
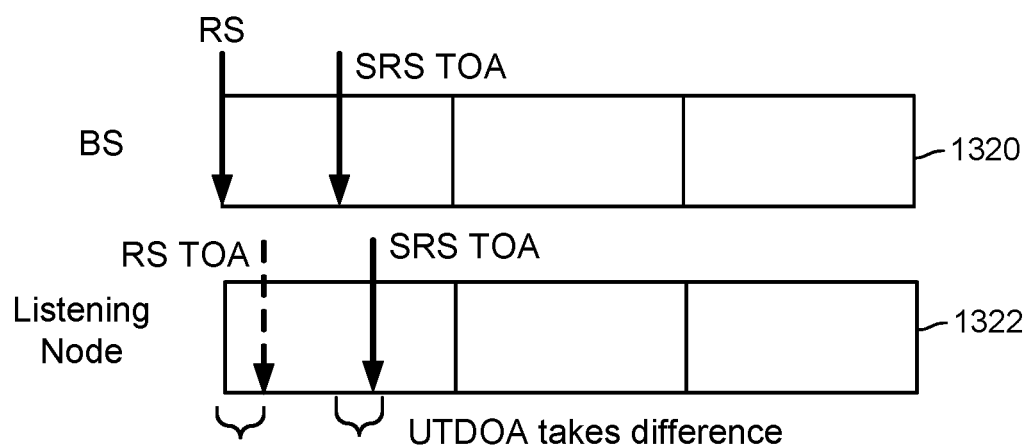

FIG. 13 illustrates an exemplary technique for enabling UTDOA for RTT with listening nodes, according to aspects of the disclosure. In an aspect, the RTT response signal 1310 transmitted by the UE 1304 (e.g., any of the UEs described herein) to the base station 1302 (e.g., any of the base stations described herein) and heard, with some amount of interference, by a listening node 1310 (e.g., a neighboring base station or a UE with a known location) as RTT response signal 1312, can be used as a synchronization signal. That is, because of the multipath propagation of RF signals, the RTT response signal transmitted by the UE 1304 arrives at the base station 1302 as RTT response signal 1310 and at the listening node 1310 as RTT response signal 1312. Note that the propagation delay $T_{Prop,BS \to LN}$ between the base station 1302 and the listening node 1310 may be known or calculated as discussed above with reference to FIG. 8, and there may be some discernable interference of the RTT response signal 1312.

In an aspect, the RTT response 1312 from the UE 1304 heard at the listening node 1310 can be used for UTDOA. The propagation delay $T_{Prop,BS \to LN}$ can be used to deduce the relative timing for frame boundaries between the base station 1302 and the listening node 1310, as discussed above with respect to FIG. 12, but replacing the listening node 1310 with a UE 1304. Frame sequences 1320 and 1322 have been synchronized, and can therefore be used for UTDOA procedures with a UE 1304. Specifically, once both the base station 1302 and the listening node 1310 are synchronized, they can be used as a pair of nodes for an UTDOA procedure involving the UE 1304.

There are a number of implications to the relevant standards. For example, the RTT measurement signal may indicate whether the UE should send a report of $T_{Rx \to Tx}$. In the case of an RTT procedure, the UE may be instructed to send a UE measurement report that includes $T_{Rx \to Tx}$. A benefit of the UE sending such a report is that fewer listening nodes and base stations are needed for positioning (e.g., at least three nodes). A disadvantage, however, is that uplink resource allocation (RA) and the link budget need to accommodate the measurement report.

In the case of an UTDOA procedure, the report (e.g., the UE measurement report that includes the measurement $T_{Rx \to Tx}$) from the UE can be omitted. A benefit of the UE not sending the report is that uplink RA and the link budget can be extended, since no measurement report is using those resources. Alternatively, the power needed for transmitting the report can be used for SRS instead. A disadvantage, however, is that more listening nodes and base stations are needed for positioning (e.g., at least four nodes).

Further, the network (e.g., location server 230, LMF 270) may request a measurement report from the UE, but the implementation may decide to use UTDOA instead of RTT for accuracy considerations (UTDOA is more accurate), and the like. Also, an additional report for synchronization error may be needed so that the network has flexibility to apply UTDOA or RTT.

Figure 14:
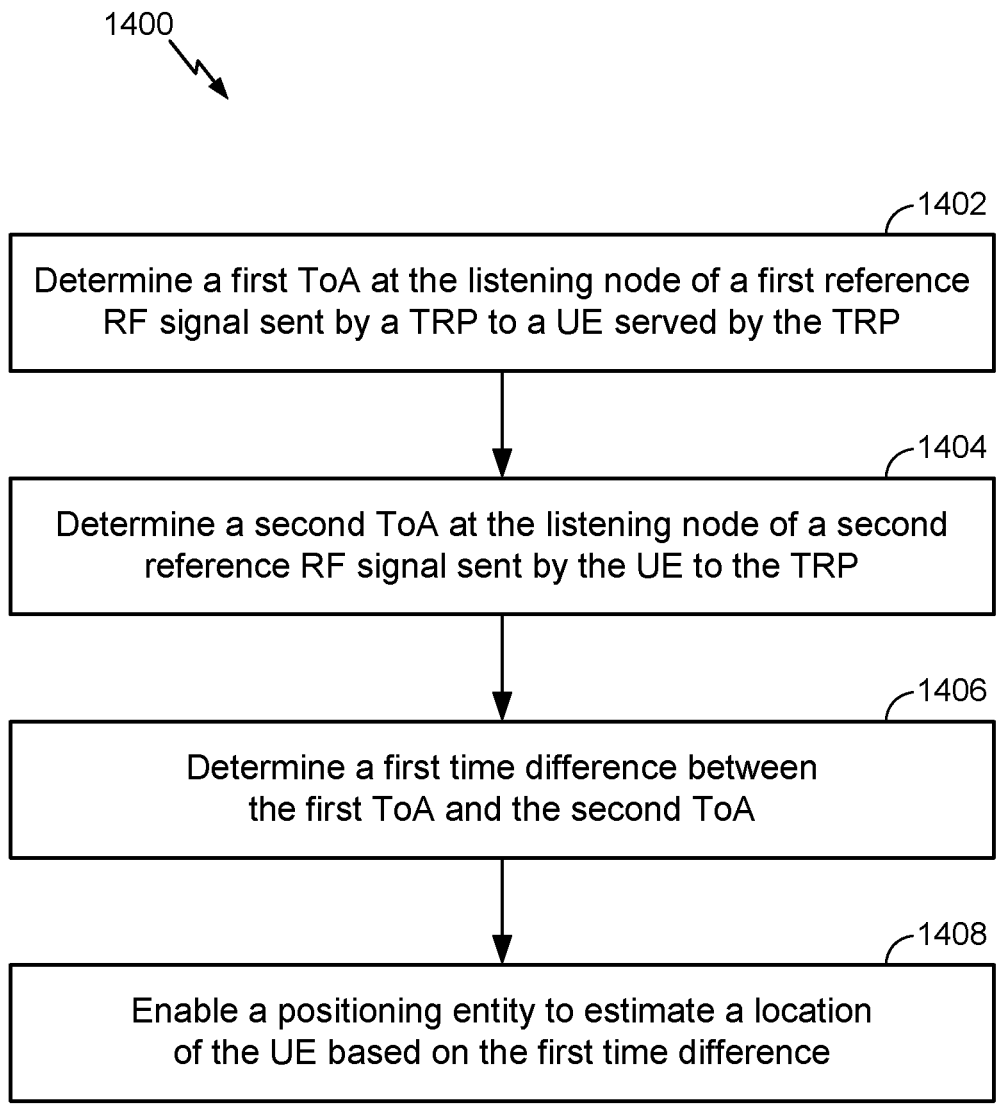
FIG. 14 illustrates an exemplary method of operating a listening node in a wireless communications network, according to aspects of the disclosure.

FIG. 14 illustrates an exemplary method 1400 of operating a listening node (e.g., any of the listening nodes described herein) in a wireless communications network (e.g., wireless communications network 100), according to aspects of the disclosure.

At 1402, the listening node determines a first ToA (e.g., time $T_3$ in FIG. 8) at the listening node of a first reference RF signal (e.g., RTT measurement signal 812 in FIG. 8) sent by a TRP (e.g., a base station or antenna array of a base station) to a UE. In an aspect, where the listening node is a base station, operation 1402 may be performed by WWAN transceiver 350 (e.g., receiver(s) 352), processing system 384, memory 386, and/or RTT positioning module 388, any or all of which may be considered means for performing this operation. In an aspect, where the listening node is a UE with a known location, operation 1402 may be performed by WWAN transceiver 310 (e.g., receiver(s) 312), processing system 332, memory 340, and/or RTT positioning module 342, any or all of which may be considered means for performing this operation.

At 1404, the listening node determines a second ToA (e.g., time $T_6$ in FIG. 8) at the listening node of a second reference RF signal (e.g., RTT response signal 822) sent by the UE to the TRP. In an aspect, where the listening node is a base station, operation 1404 may be performed by WWAN transceiver 350 (e.g., receiver(s) 352), processing system 384, memory 386, and/or RTT positioning module 388, any or all of which may be considered means for performing this operation. In an aspect, where the listening node is a UE with a known location, operation 1404 may be performed by WWAN transceiver 310 (e.g., receiver(s) 312), processing system 332, memory 340, and/or RTT positioning module 342, any or all of which may be considered means for performing this operation.

At 1406, the listening node 710 determines a first time difference (e.g., $T_{BS\text{-}Rx \to UE\text{-}Rx}$ in FIG. 8) between the first ToA and the second ToA. In an aspect, where the listening node is a base station, operation 1406 may be performed by WWAN transceiver 350, processing system 384, memory 386, and/or RTT positioning module 388, any or all of which may be considered means for performing this operation. In an aspect, where the listening node is a UE with a known location, operation 1406 may be performed by WWAN transceiver 310, processing system 332, memory 340, and/or RTT positioning module 342, any or all of which may be considered means for performing this operation.

At 1408, the listening node enables a positioning entity (e.g., location server 230, LMF 270, the serving base station, the UE, the listening node itself) to estimate a location of the UE based on the first time difference. For example, the positioning entity may calculate a distance between the listening node and the UE based on the first time difference, a propagation time between the TRP and the listening node (e.g., $T_{Prop,BS \to LN}$ in FIG. 8), a propagation time between the TRP and the UE (e.g., $T_{Prop,BS \to UE}$ in FIG. 8), and a second time difference between a ToA (e.g., time $T_2$ in FIG. 8) of the first reference RF signal at the UE and a transmission time (e.g., time $T_4$ in FIG. 8) of the second reference RF signal from the UE (e.g., $T_{RX \to TX}$ in FIG. 8). In an aspect, where the listening node is a base station, operation 1408 may be performed by WWAN transceiver 350 (e.g., transmitter(s) 354), WLAN transceiver 360, network interface(s) 380, processing system 384, memory 386, and/or RTT positioning module 388, any or all of which may be considered means for performing this operation. In an aspect, where the listening node is a UE with a known location, operation 1408 may be performed by WWAN transceiver 310 (e.g., transmitter(s) 314), processing system 332, memory 340, and/or RTT positioning module 342, any or all of which may be considered means for performing this operation.

In an aspect, the listening node may include the positioning entity (e.g., as a separate logical entity or hardware component). In an aspect, where the listening node includes the positioning entity, the method 1400 may further include determining the location of the UE based on the distance between the listening node and the UE, a distance between at least one other listening node and the UE, and a distance between the TRP and the UE.

In an aspect, where the listening node includes the positioning entity, the method 1400 may further include calculating a distance between the listening node and the UE based on the first time difference, a propagation time between the TRP and the listening node, a propagation time between the TRP and the UE, and a second time difference between a ToA of the first reference RF signal at the UE and a transmission time of the second reference RF signal from the UE. In an aspect, the propagation time between the TRP and the UE may be determined from an RTT procedure between the TRP and the UE, and the method 1400 may further include receiving a measurement report from the UE, the measurement report including the second time difference. In an aspect, the method 1400 may further include determining the propagation time between the TRP and the listening node from known locations of the listening node and the TRP. In an aspect, the method 1400 may further include determining the propagation time between the TRP and the listening node from an RTT procedure between the listening node and the TRP.

In an aspect, the listening node does not perform an RTT procedure with the UE.

In an aspect, the first reference RF signal may be transmitted by the TRP on a plurality of beams, the first reference RF signal may be received at the listening node on a first beam of the plurality of beams, and the first reference RF signal may be received at the UE on a second beam of the plurality of beams.

In an aspect, the second reference RF signal may be transmitted by the UE on a plurality of beams, the second reference RF signal may be received at the listening node on a first beam of the plurality of beams, and the second reference RF signal may be received at the TRP on a second beam of the plurality of beams.

In an aspect, the method 1400 may further include reporting a first reference RF signal identifier of the first reference RF signal to the positioning entity, a second reference RF signal identifier of the second reference RF signal to the positioning entity, or any combination thereof.

In an aspect, the TRP and the listening node may not be time synchronized.

In an aspect, the first reference RF signal may be an acknowledgment (ACK) signal and/or the second reference RF signal comprises a sounding reference signal (SRS).

In an aspect, the listening node may be a TRP neighboring the UE.

In an aspect, the listening node may be a second UE with a known location.

Figure 15:
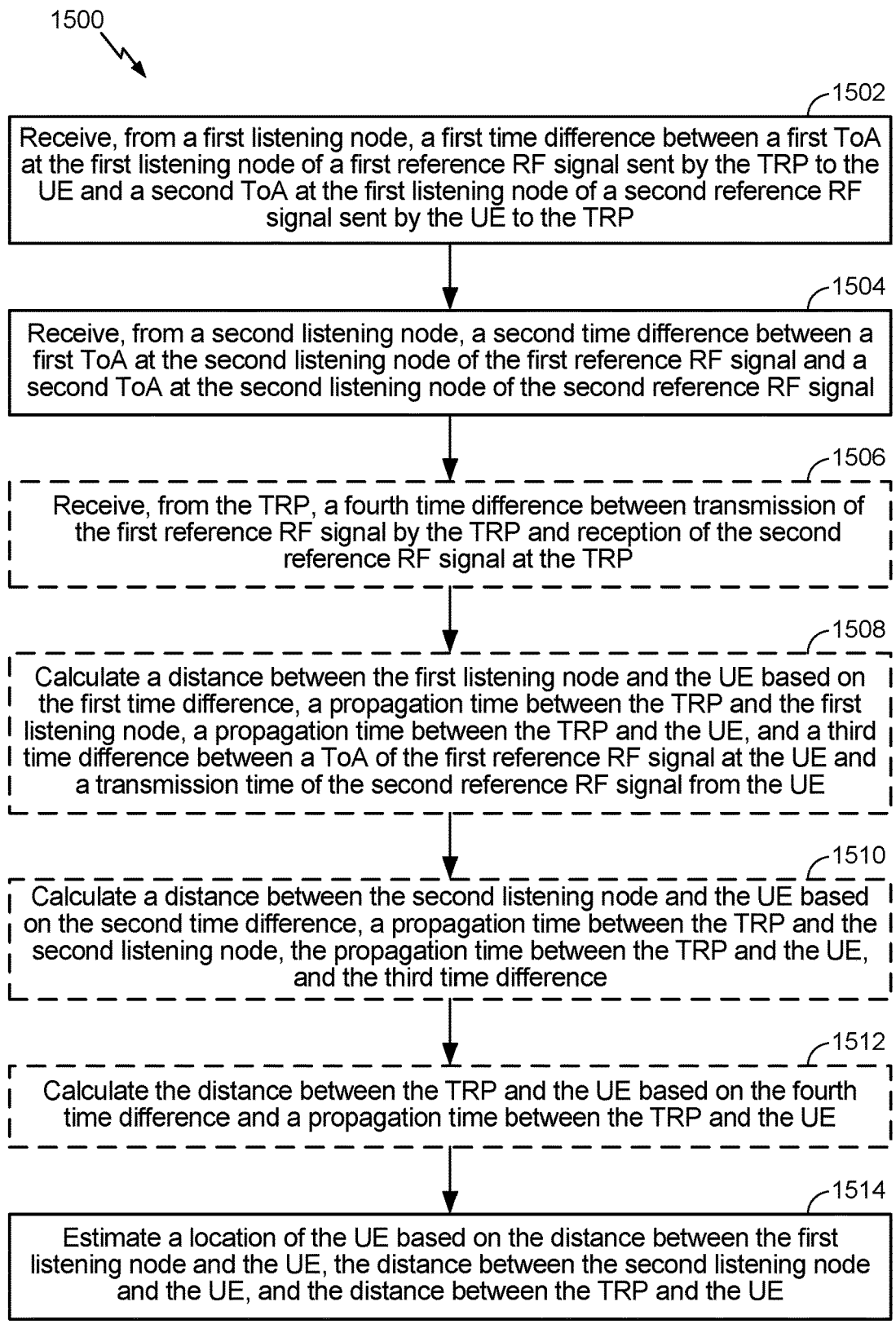
FIG. 15 illustrates an exemplary method of operating a positioning entity in a wireless communication network, according to aspects of the disclosure.

FIG. 15 illustrates an exemplary method 1500 of operating a positioning entity, such as location server 230, LMF 270, a serving base station, a UE, or a listening node, according to aspects of the disclosure.

At 1502, the positioning entity receives, from a first listening node, a first time difference (e.g., $T_{BS\text{-}Rx \to UE\text{-}Rx}$ in FIG. 8) between a first ToA (e.g., time $T_3$ in FIG. 8) at the first listening node of a first reference RF signal (e.g., an RTT measurement signal) sent by a TRP to a UE and a second ToA (e.g., time $T_6$ in FIG. 8) at the first listening node of a second reference RF signal (e.g., an RTT response signal) sent by the UE to the TRP. In an aspect, where the positioning entity is a network entity, operation 1502 may be performed by network interface(s) 390, processing system 394, memory 396, and/or RTT positioning module 398, any or all of which may be considered means for performing this operation. In an aspect, where the positioning entity is a base station, operation 1502 may be performed by WWAN transceiver 350 (e.g., receiver(s) 352), WLAN transceiver 360, network interface(s) 380, processing system 384, memory 386, and/or RTT positioning module 388, any or all of which may be considered means for performing this operation. In an aspect, where the positioning entity is a UE, operation 1502 may be performed by WWAN transceiver 310 (e.g., receiver(s) 312), processing system 332, memory 340, and/or RTT positioning module 342, any or all of which may be considered means for performing this operation.

At 1504, the positioning entity receives, from a second listening node, a second time difference (e.g., $T_{BS\text{-}Rx \to UE\text{-}Rx}$ in FIG. 8) between a first ToA (e.g., time $T_3$ in FIG. 8) at the second listening node of the first reference RF signal and a second ToA (e.g., time $T_6$ in FIG. 8) at the second listening node of the second reference RF signal. In an aspect, where the positioning entity is a network entity, operation 1504 may be performed by network interface(s) 390, processing system 394, memory 396, and/or RTT positioning module 398, any or all of which may be considered means for performing this operation. In an aspect, where the positioning entity is a base station, operation 1504 may be performed by WWAN transceiver 350 (e.g., receiver(s) 352), WLAN transceiver 360, network interface(s) 380, processing system 384, memory 386, and/or RTT positioning module 388, any or all of which may be considered means for performing this operation. In an aspect, where the positioning entity is a UE, operation 1504 may be performed by WWAN transceiver 310 (e.g., receiver(s) 312), processing system 332, memory 340, and/or RTT positioning module 342, any or all of which may be considered means for performing this operation.

At 1506, the positioning entity optionally receives, from the TRP, a fourth time difference (e.g., $T_{Tx \to Rx}$ in FIG. 8) between transmission of the first reference RF signal by the TRP and reception of the second reference RF signal at the TRP. In an aspect, where the positioning entity is a network entity, operation 1506 may be performed by network interface(s) 390, processing system 394, memory 396, and/or RTT positioning module 398, any or all of which may be considered means for performing this operation. In an aspect, where the positioning entity is a base station, operation 1506 may be performed by WWAN transceiver 350 (e.g., receiver(s) 352), WLAN transceiver 360, network interface(s) 380, processing system 384, memory 386, and/or RTT positioning module 388, any or all of which may be considered means for performing this operation. In an aspect, where the positioning entity is a UE, operation 1506 may be performed by WWAN transceiver 310 (e.g., receiver(s) 312), processing system 332, memory 340, and/or RTT positioning module 342, any or all of which may be considered means for performing this operation.

At 1508, the positioning entity optionally calculates a distance between the first listening node and the UE based on the first time difference, a propagation time between the TRP and the first listening node (e.g., $T_{Prop,BS \to LN}$ in FIG. 8), a propagation time between the TRP and the UE (e.g., $T_{Prop,BS \to UE}$ in FIG. 8), and a third time difference (e.g., $T_{Rx \to Tx}$ in FIG. 8) between a ToA (e.g., time $T_2$ in FIG. 8) of the first reference RF signal at the UE and a transmission time (e.g., time $T_4$ in FIG. 8) of the second reference RF signal from the UE. In an aspect, where the positioning entity is a network entity, operation 1508 may be performed by processing system 394, memory 396, and/or RTT positioning module 398, any or all of which may be considered means for performing this operation. In an aspect, where the positioning entity is a base station, operation 1508 may be performed by processing system 384, memory 386, and/or RTT positioning module 388, any or all of which may be considered means for performing this operation. In an aspect, where the positioning entity is a UE, operation 1508 may be performed by processing system 332, memory 340, and/or RTT positioning module 342, any or all of which may be considered means for performing this operation.

At 1510, the positioning entity optionally calculates a distance between the second listening node and the UE based on the second time difference, a propagation time between the TRP and the second listening node (e.g., $T_{Prop,BS \to LN}$ in FIG. 8), the propagation time between the TRP and the UE, and the third time difference. In an aspect, where the positioning entity is a network entity, operation 1510 may be performed by processing system 394, memory 396, and/or RTT positioning module 398, any or all of which may be considered means for performing this operation. In an aspect, where the positioning entity is a base station, operation 1510 may be performed by processing system 384, memory 386, and/or RTT positioning module 388, any or all of which may be considered means for performing this operation. In an aspect, where the positioning entity is a UE, operation 1510 may be performed by processing system 332, memory 340, and/or RTT positioning module 342, any or all of which may be considered means for performing this operation.

At 1512, the positioning entity optionally calculates the distance between the TRP and the UE based on the fourth time difference and the propagation time between the TRP and the UE. In an aspect, where the positioning entity is a network entity, operation 1512 may be performed by processing system 394, memory 396, and/or RTT positioning module 398, any or all of which may be considered means for performing this operation. In an aspect, where the positioning entity is a base station, operation 1512 may be performed by processing system 384, memory 386, and/or RTT positioning module 388, any or all of which may be considered means for performing this operation. In an aspect, where the positioning entity is a UE, operation 1512 may be performed by processing system 332, memory 340, and/or RTT positioning module 342, any or all of which may be considered means for performing this operation.

At 1514, the positioning entity estimates a location of the UE based on the distance between the first listening node and the UE, the distance between the second listening node and the UE, and the distance between the TRP and the UE. In an aspect, where the positioning entity is a network entity, operation 1514 may be performed by processing system 394, memory 396, and/or RTT positioning module 398, any or all of which may be considered means for performing this operation. In an aspect, where the positioning entity is a base station, operation 1514 may be performed by processing system 384, memory 386, and/or RTT positioning module 388, any or all of which may be considered means for performing this operation. In an aspect, where the positioning entity is a UE, operation 1514 may be performed by processing system 332, memory 340, and/or RTT positioning module 342, any or all of which may be considered means for performing this operation.

In an aspect, the method 1500 may further include receiving, from the UE, a measurement report including the third time difference.

In an aspect, the method 1500 may further include determining the propagation times between the TRP and the first and second listening nodes from known locations of the first and second listening nodes and the TRP.

In an aspect, the method 1500 may further include determining the propagation times between the TRP and the first and second listening nodes from RTT procedures between the first and second listening nodes and the TRP.

In an aspect, the first reference RF signal may be a positioning reference signal (PRS) and the second reference RF signal may be a sounding reference signal (SRS).

In an aspect, the method 1500 may further include receiving, from the UE via the at least one network interface, a fourth time difference between transmission of the second reference RF signal by the UE and reception of the first reference RF signal at the UE, and calculating the distance between the TRP and the UE based on the fourth time difference and a propagation time between the TRP and the UE. These operations could replace operations 1510 and 1512. In this aspect, the first reference RF signal may be an acknowledgment (ACK) signal and/or the second reference RF signal may be a sounding reference signal (SRS).

In an aspect, the first reference RF signal may be transmitted by the TRP on a plurality of beams, the first reference RF signal may be received at the first listening node on a first beam of the plurality of beams, the first reference RF signal may be received at the second listening node on a second beam of the plurality of beams, and the first reference RF signal may be received at the UE on a third beam of the plurality of beams.

In an aspect, the second reference RF signal may be transmitted by the UE on a plurality of beams, the second reference RF signal may be received at the first listening node on a first beam of the plurality of beams, the second reference RF signal may be received at the second listening node on a second beam of the plurality of beams, and the second reference RF signal may be received at the base station on a third beam of the plurality of beams.

In an aspect, the method 1500 may further include receiving, from the first listening node or the second listening node, a first reference RF signal identifier of the first reference RF signal, a second reference RF signal identifier of the second reference RF signal, or any combination thereof. In this aspect, the method 1500 may further include calculating the distance between the listening node and the UE based on the first reference RF signal identifier, the second reference RF signal identifier, or any combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A listening node, comprising:
   a memory;
   at least one transceiver; and
   a processing system communicatively coupled to the memory and the at least one transceiver, wherein the processing system is configured to:
      determine a first time of arrival (ToA) at the listening node of a first reference radio frequency (RF) signal transmitted by a transmission-reception point (TRP) to a user equipment (UE) on at least one beam, the first reference RF signal comprising a positioning reference signal (PRS);
      determine a second ToA at the listening node of a second reference RF signal transmitted by the UE to the TRP on at least one beam, the second reference RF signal comprising a sounding reference signal (SRS);
      determine a first time difference between the first ToA and the second ToA; and
      send the first time difference to a positioning entity, wherein a location of the UE is based on at least a distance between the listening node and the UE, and wherein the distance between the listening node and the UE is based on the first time difference, a propagation time between the TRP and the listening node, a propagation time between the TRP and the UE, and a second time difference between a ToA of the first reference RF signal at the UE and a transmission time of the second reference RF signal from the UE.

2. The listening node of claim 1, wherein the listening node includes the positioning entity.

3. The listening node of claim 2, wherein the at least one processor is further configured to:
   calculate the distance between the listening node and the UE based on the first time difference, the propagation time between the TRP and the listening node, the propagation time between the TRP and the UE, and the second time difference between the ToA of the first reference RF signal at the UE and the transmission time of the second reference RF signal from the UE.

4. The listening node of claim 3, wherein the propagation time between the TRP and the UE is determined from a round-trip-time (RTT) procedure between the TRP and the UE, and wherein the at least one processor is further configured to:
   receive, via the at least one transceiver, a measurement report from the UE, the measurement report including the second time difference.

5. The listening node of claim 3, wherein the at least one processor is further configured to:
   determine the propagation time between the TRP and the listening node from known locations of the listening node and the TRP.

6. The listening node of claim 3, wherein the at least one processor is further configured to:
   determine the propagation time between the TRP and the listening node from an RTT procedure between the listening node and the TRP.

7. The listening node of claim 2, wherein the at least one processor is further configured to:
   determine the location of the UE based on the distance between the listening node and the UE, a distance between at least one other listening node and the UE, and a distance between the TRP and the UE.

8. The listening node of claim 1, wherein the listening node does not perform an RTT procedure with the UE.

9. The listening node of claim 1, wherein:
   the first reference RF signal is transmitted by the TRP on a plurality of beams,
   the first reference RF signal is received at the listening node on a first beam of the plurality of beams, and
   the first reference RF signal is received at the UE on a second beam of the plurality of beams.

10. The listening node of claim 1, wherein:
    the second reference RF signal is transmitted by the UE on a plurality of beams,
    the second reference RF signal is received at the listening node on a first beam of the plurality of beams, and
    the second reference RF signal is received at the TRP on a second beam of the plurality of beams.

11. The listening node of claim 1, wherein the at least one processor is further configured to:
    report a first reference RF signal identifier of the first reference RF signal to the positioning entity, a second reference RF signal identifier of the second reference RF signal to the positioning entity, or any combination thereof.

12. The listening node of claim 1, wherein the TRP and the listening node are not time synchronized.

13. The listening node of claim 1, wherein:
    the listening node comprises a TRP neighboring the UE, or
    the listening node comprises a second UE with a known location.

14. A listening node, comprising:
    means for processing configured to:
       determine a first time of arrival (ToA) at the listening node of a first reference radio frequency (RF) signal transmitted by a transmission-reception point (TRP) to a user equipment (UE) on at least one beam, the first reference RF signal comprising a positioning reference signal (PRS);

determine a second ToA at the listening node of a second reference RF signal transmitted by the UE to the TRP on at least one beam, the second reference RF signal comprising a sounding reference signal (SRS);

determine a first time difference between the first ToA and the second ToA; and send the first time difference to a positioning entity, wherein a location of the UE is based on at least a distance between the listening node and the UE, and wherein the distance between the listening node and the UE is based on the first time difference, a propagation time between the TRP and the listening node, a propagation time between the TRP and the UE, and a second time difference between a ToA of the first reference RF signal at the UE and a transmission time of the second reference RF signal from the UE.

15. The listening node of claim 14, wherein the listening node includes the positioning entity.

16. The listening node of claim 15, wherein the means for processing is further configured to:

calculate the distance between the listening node and the UE based on the first time difference, the propagation time between the TRP and the listening node, the propagation time between the TRP and the UE, and the second time difference between the ToA of the first reference RF signal at the UE and the transmission time of the second reference RF signal from the UE.

17. The listening node of claim 16, wherein the propagation time between the TRP and the UE is determined from a round-trip-time (RTT) procedure between the TRP and the UE, the means for processing further configured to:

receive a measurement report from the UE, the measurement report including the second time difference.

18. The listening node of claim 16, wherein the means for processing is further configured to:

determine the propagation time between the TRP and the listening node from known locations of the listening node and the TRP.

19. The listening node of claim 16, wherein the means for processing is further configured to:

determine the propagation time between the TRP and the listening node from an RTT procedure between the listening node and the TRP.

20. The listening node of claim 15, wherein the means for processing is further configured to:

determine the location of the UE based on the distance between the listening node and the UE, a distance between at least one other listening node and the UE, and a distance between the TRP and the UE.

21. The listening node of claim 14, wherein:
the first reference RF signal is transmitted by the TRP on a plurality of beams,
the first reference RF signal is received at the listening node on a first beam of the plurality of beams, and
the first reference RF signal is received at the UE on a second beam of the plurality of beams.

22. The listening node of claim 14, wherein:
the second reference RF signal is transmitted by the UE on a plurality of beams,
the second reference RF signal is received at the listening node on a first beam of the plurality of beams, and
the second reference RF signal is received at the TRP on a second beam of the plurality of beams.

23. The listening node of claim 14, wherein the means for processing is further configured to:

report a first reference RF signal identifier of the first reference RF signal to the positioning entity, a second reference RF signal identifier of the second reference RF signal to the positioning entity, or any combination thereof.

24. The listening node of claim 14, wherein:
the listening node comprises a TRP neighboring the UE, or
the listening node comprises a second UE with a known location.

25. A method of operating a listening node, comprising:

determining a first time of arrival (ToA) at the listening node of a first reference radio frequency (RF) signal transmitted by a transmission-reception point (TRP) to a user equipment (UE) on at least one beam, the first reference RF signal comprising a positioning reference signal (PRS);

determining a second ToA at the listening node of a second reference RF signal transmitted by the UE to the TRP on at least one beam, the second reference RF signal comprising a sounding reference signal (SRS);

determining a first time difference between the first ToA and the second ToA; and sending the first time difference to a positioning entity, wherein a location of the UE is based on at least a distance between the listening node and the UE, and wherein the distance between the listening node and the UE is based on the first time difference, a propagation time between the TRP and the listening node, a propagation time between the TRP and the UE, and a second time difference between a ToA of the first reference RF signal at the UE and a transmission time of the second reference RF signal from the UE.

26. A positioning entity, comprising:
a memory;
at least one network interface; and
a processing system communicatively coupled to the memory and the at least one network interface, wherein the processing system is configured to:

receive, from a first listening node via the at least one network interface, a first time difference between a first time of arrival (ToA) at the first listening node of a first reference radio frequency (RF) signal sent by a transmission-reception point (TRP) to a user equipment (UE) and a second ToA at the first listening node of a second reference RF signal sent by the UE to the TRP;

receive, from a second listening node via the at least one network interface, a second time difference between a first ToA at the second listening node of the first reference RF signal sent by the TRP to the UE and a second ToA at the second listening node of the second reference RF signal sent by the UE to the TRP;

calculate the distance between the first listening node and the UE based on the first time difference, a propagation time between the TRP and the first listening node, a propagation time between the TRP and the UE, and a third time difference between a ToA of the first reference RF signal at the UE and a transmission time of the second reference RF signal from the UE;

calculate the distance between the second listening node and the UE based on the second time difference, a propagation time between the TRP and the second listening node, the propagation time between the TRP and the UE, and the third time difference; and estimate a location of the UE based on the distance between the first listening node and the UE, the distance between the second listening node and the UE, and a distance between the TRP and the UE.

27. The positioning entity of claim 26, wherein the at least one processor is further configured to:

determine the propagation times between the TRP and the first and second listening nodes from known locations of the first and second listening nodes and the TRP, or determine the propagation times between the TRP and the first and second listening nodes from RTT procedures between the first and second listening nodes and the TRP.

28. The positioning entity of claim 26, wherein the at least one processor is further configured to:

receive, from the TR via the at least one network interface, a fourth time difference between transmission of the first reference RF signal by the TRP and reception of the second reference RF signal at the TRP; and calculate the distance between the TRP and the UE based on the fourth time difference and a propagation time between the TRP and the UE.

* * * * *